(12) United States Patent
Li

(10) Patent No.: US 10,679,033 B2
(45) Date of Patent: Jun. 9, 2020

(54) DISPLAY PANEL AND DISPLAY APPARATUS

(71) Applicant: Wuhan Tianma Micro-Electronics Co., Ltd., Wuhan (CN)

(72) Inventor: Bo Li, Wuhan (CN)

(73) Assignee: Wuhan Tianma Micro-Electronics Co., Ltd., Wuhan (CN)

( * ) Notice: Subject to any disclaimer, the term of this patent is extended or adjusted under 35 U.S.C. 154(b) by 50 days.

(21) Appl. No.: 16/225,222

(22) Filed: Dec. 19, 2018

(65) Prior Publication Data

US 2019/0332843 A1 Oct. 31, 2019

(30) Foreign Application Priority Data

Apr. 28, 2018 (CN) .......................... 2018 1 0400785

(51) Int. Cl.
*G06K 9/00* (2006.01)
*G09G 3/3208* (2016.01)
*G06K 9/22* (2006.01)

(52) U.S. Cl.
CPC .......... *G06K 9/0004* (2013.01); *G09G 3/3208* (2013.01); *G09G 2300/0452* (2013.01)

(58) Field of Classification Search
CPC ..... G06K 9/0004; G09G 3/3208; H01L 27/32
See application file for complete search history.

(56) References Cited

U.S. PATENT DOCUMENTS

| | | | |
|---|---|---|---|
| 2016/0054844 A1* | 2/2016 | Lin | G06F 3/0416 345/173 |
| 2016/0092717 A1* | 3/2016 | Ling | G06K 9/0004 382/125 |
| 2016/0364591 A1* | 12/2016 | El-Khoury | G06K 9/0002 |
| 2017/0024598 A1* | 1/2017 | Chiang | G06K 9/38 |
| 2017/0061194 A1* | 3/2017 | Chiang | G06K 9/0002 |
| 2017/0153743 A1* | 6/2017 | Kim | G06F 3/0414 |
| 2017/0221972 A1* | 8/2017 | Yang | G06K 9/0004 |
| 2017/0336909 A1* | 11/2017 | Song | G06F 3/0416 |
| 2018/0033835 A1* | 2/2018 | Zeng | G06F 3/0412 |
| 2018/0053032 A1* | 2/2018 | Ding | G06K 9/0004 |
| 2018/0068166 A1* | 3/2018 | Zeng | G06K 9/00033 |
| 2018/0089491 A1* | 3/2018 | Kim | G06K 9/00912 |
| 2018/0211079 A1* | 7/2018 | Liu | G06F 3/041 |
| 2018/0224999 A1* | 8/2018 | Lee | G06F 3/0488 |
| 2018/0365471 A1* | 12/2018 | Xin | H01L 27/326 |
| 2019/0034696 A1* | 1/2019 | Zhang | G06K 9/00067 |
| 2019/0035859 A1* | 1/2019 | Kang | G06F 3/044 |
| 2019/0220643 A1* | 7/2019 | Ling | H01L 27/3234 |
| 2019/0244562 A1* | 8/2019 | Zhu | H01L 51/5221 |
| 2019/0286869 A1* | 9/2019 | Ling | H01L 27/323 |
| 2019/0303638 A1* | 10/2019 | Zeng | G06F 21/32 |

(Continued)

*Primary Examiner* — Sepehr Azari
(74) *Attorney, Agent, or Firm* — Miller, Matthias & Hull LLP

(57) ABSTRACT

Disclosed are a display panel and a display apparatus. The display panel includes a display region and a non-display region surrounding the display region, a base substrate, and a plurality of fingerprint identification units disposed on a side of the base substrate and in the display region and used for performing fingerprint identification according to light reflected by a touch body to the fingerprint identification units. The display region includes at least two display sub-regions with different fingerprint identification precision.

25 Claims, 17 Drawing Sheets

(56) References Cited

U.S. PATENT DOCUMENTS

2019/0303640 A1* 10/2019 Song .................. G06K 9/0004
2019/0310724 A1* 10/2019 Yeke Yazdandoost ......................
                                                    G06F 3/0412
2019/0332842 A1* 10/2019 Zhou ................. H01L 27/3276
2019/0340409 A1* 11/2019 Zhu ...................... H01L 27/323

* cited by examiner

DISPLAY PANEL AND DISPLAY APPARATUS

CROSS-REFERENCES TO RELATED APPLICATIONS

This application claims priority to a Chinese patent application No. 201810400785.X filed on Apr. 28, 2018, the disclosure of which is incorporated herein by reference in its entirety.

TECHNICAL FIELD

Embodiments of the present disclosure relate to a display technology, and in particular, relate to a display panel and a display apparatus.

BACKGROUND

At present, a display panel is widely used as an information input tool in a various display apparatuses such as a mobile phone, a tablet personal computer (PC), an information inquiry machine in a public service hall. As a way of user identity authentication and access control, a fingerprint identification is widely used in display panels due to its advantage of high security.

To improve the user experience, the entire display region of the display panel is generally provided with fingerprint identification units, so that the user may perform fingerprint identification when operating a full-screen display product, and the function of the display panel is enriched. Toward that end, to achieve a better user experience, fingerprint recognition precision of the display panel needs to be improved. However, the higher the fingerprint identification precision of the display panel is, the larger the power consumption of the display panel and the noise interference of signal lines are. Therefore, in the related art, a display panel with high-precision fingerprint identification has a problem of large power consumption and large noise interference of signal lines, which affects the performance of the display panel.

SUMMARY

The present disclosure provides a display panel and a display apparatus to reduce power consumption of a display panel and noise interference of signal lines and improve the performance of the display panel.

In a first aspect, an embodiment of the present disclosure provides a display panel including a display region and a non-display region surrounding the display region;
 a base substrate; and
 a plurality of fingerprint identification units disposed on a side of the base substrate and in the display region and used for performing an fingerprint identification according to light reflected by a touch body to the fingerprint identification units.

The display region includes a plurality of display sub-regions.

At least two of the plurality of display sub-regions are different in fingerprint identification precision.

In a second aspect, an embodiment of the present disclosure further provides a display apparatus including the display panel described in any one of embodiments of the present disclosure.

In the present disclosure, the display region of the display panel includes at least two display sub-regions with different fingerprint identification precision. That is, in the embodiments of the present disclosure, the display panel includes a region with high fingerprint identification precision and a region with low fingerprint identification precision. In the region with low fingerprint identification precision, power consumption required by the fingerprint identification unit and interference to other signal lines are reduced. In the region with high fingerprint identification precision, the fingerprint identification unit may implement a high-precision fingerprint identification.

DETAILED DESCRIPTION

Figure 1:
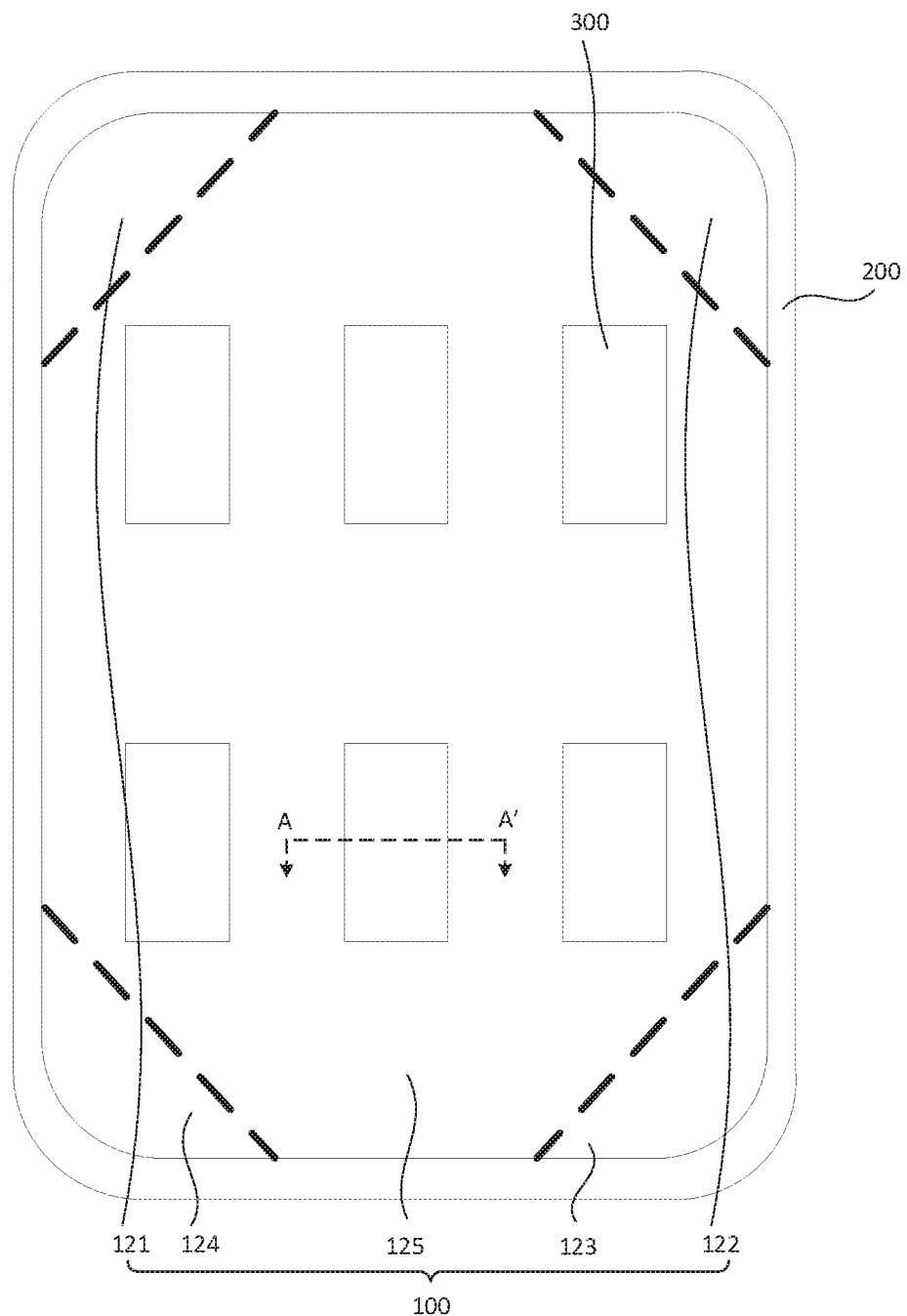
FIG. 1 is a structural diagram of a display panel according to an embodiment of the present disclosure.

The present disclosure will be further described in detail in conjunction with the drawings and embodiments. It is to be understood that the embodiments set forth below are intended to illustrate and not to limit the present disclosure. Additionally, it is to be noted that, for ease of description, only part, not all, of structures related to the present disclosure are illustrated in the drawings.

Figure 2:
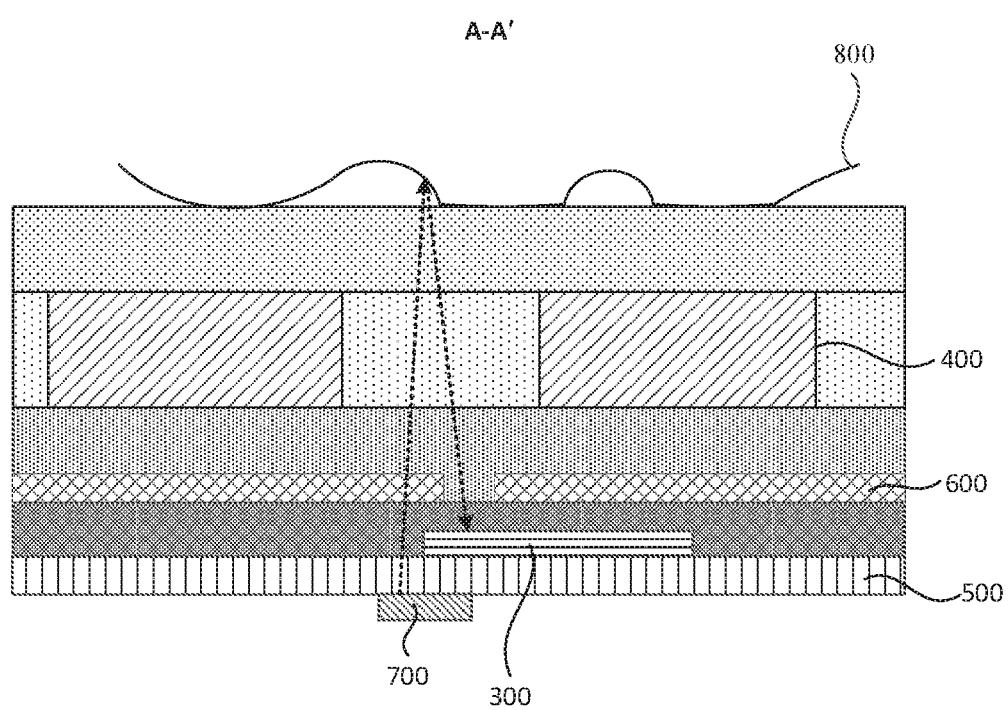
FIG. 2 is a cross-sectional view of the display panel taken along a line A-A' of FIG. 1.

FIG. 1 is a structural diagram of a display panel according to an embodiment of the present disclosure, and FIG. 2 is a cross-sectional view of the display panel taken along a line A-A' of FIG. 1. Referring to FIGS. 1 and 2, the display panel includes: a display region 100 and a non-display region 200 surrounding the display region 100. The display panel further includes a base substrate 500, a light source 700, a pixel driving circuit 600, a pixel unit 400 and a plurality of fingerprint identification units 300 disposed on a side of the base substrate 500. The fingerprint identification units 300 are disposed in the display region 100 and used for performing fingerprint identification according to light reflected by a touch body 800 to the fingerprint identification units 300. The display region 100 includes multiple display sub-regions. At least two of the multiple display sub-regions are different in fingerprint identification precision. Exemplarily, the at least two of the display sub-regions in FIG. 1 include a display sub-region 121, a display sub-region 122, a display sub-region 123, a display sub-region 124, and a display sub-region 125. Various ways exist for setting the fingerprint identification precision of the display sub-region 121, the display sub-region 122, the display sub-region 123, the display sub-region 124 and the display sub-region 125, which are not limited by the present disclosure.

In the embodiments of the present disclosure, the display region 100 includes at least two display sub-regions with different fingerprint identification precision, that is, the display panel is configured to include a region with high fingerprint identification precision and a region with low fingerprint identification precision. As the size of the display panel becomes larger, when a user operates the display panel, the user tends to perform frequent operations in a certain region of the display panel, and this region is a high touch frequency region of the display panel. According to the user's touch habits, the display sub-region corresponding to the high touch frequency region is with high fingerprint identification precision, and the display sub-region corresponding to a low touch frequency region is with low fingerprint identification precision. Compared with the related art in which the fingerprint identification precision of the entire display region is improved, the region with low fingerprint identification precision is set in the present disclosure, reducing the power consumption required by the fingerprint identification unit 300 and the interference to other signal lines. In the region with high fingerprint identification precision, the fingerprint identification unit 300 may implement a high-precision identification of fingerprints. Therefore, the fingerprint identification precision of the display panel provided by the present disclosure is improved, the power consumption is reduced, and the noise interference between signal lines is also reduced. By setting different fingerprint identification precisions in different regions, the present disclosure may reduce the power consumption of the entire display panel and the noise interference of the signal lines on the basis of satisfying the requirement of providing the high-precision fingerprint identification in some regions of the display panel. Moreover, the display panel provided by the present disclosure has high fingerprint identification precision in the display sub-region corresponding to the high touch frequency region, and low fingerprint identification precision in the display sub-region corresponding to the non-high touch frequency region to reduce the power consumption. In this case, the power consumption of the non-high touch frequency region is reduced, while the power consumption of the high touch frequency region is increased, such that the total power consumption is not changed. That is, relative to the related art with the same power consumption, the display panel provided by the embodiments of the present disclosure may provide a more favorable driving (such as providing a stronger driving signal to make the fingerprint identification unit more sensitive to a light signal) for the fingerprint identification unit 300 of the display sub-region corresponding to the high touch frequency region, and increase the fingerprint identification precision. A region in which the fingerprint identification precision is increased is the high touch frequency region where the touch body 800 touches more frequently and the detection frequency is higher. Therefore, the effect of improving the fingerprint identification precision of the display panel is more remarkable, and no power consumption is increased. In summary, embodiments of the present disclosure improve the quality of the display panel and user operation experience.

Continually referring to FIG. 1, the display sub-region 121, the display sub-region 122, the display sub-region 123, and the display sub-region 124 are disposed at four corners of the display region 100, and the display sub-region 125 is disposed in the middle of the display region 100. Optionally, the fingerprint identification precisions of the display sub-region 121, the display sub-region 122, the display sub-region 123, and the display sub-region 124 are lower than the fingerprint identification precision of the display sub-region 125. According to the user's touch habits, the display sub-region 125 is the high touch frequency region, and the display sub-region 121, the display sub-region 122, the display sub-region 123, and the display sub-region 124 are the low touch frequency regions. Such arrangement of this embodiment reduces the power consumption of the entire display panel and the noise interference of the signal lines in addition to making the display panel with the high-precision fingerprint identification.

It is to be noted that FIG. 1 is merely an exemplary way of setting display sub-regions in the embodiments of the present disclosure and does not limit the present disclosure. In other embodiments, various ways exist for setting the number, shape, and fingerprint identification precision of at least two display sub-regions. Several typical setting ways are described below, but the present disclosure is not limited thereto.

Figure 3:
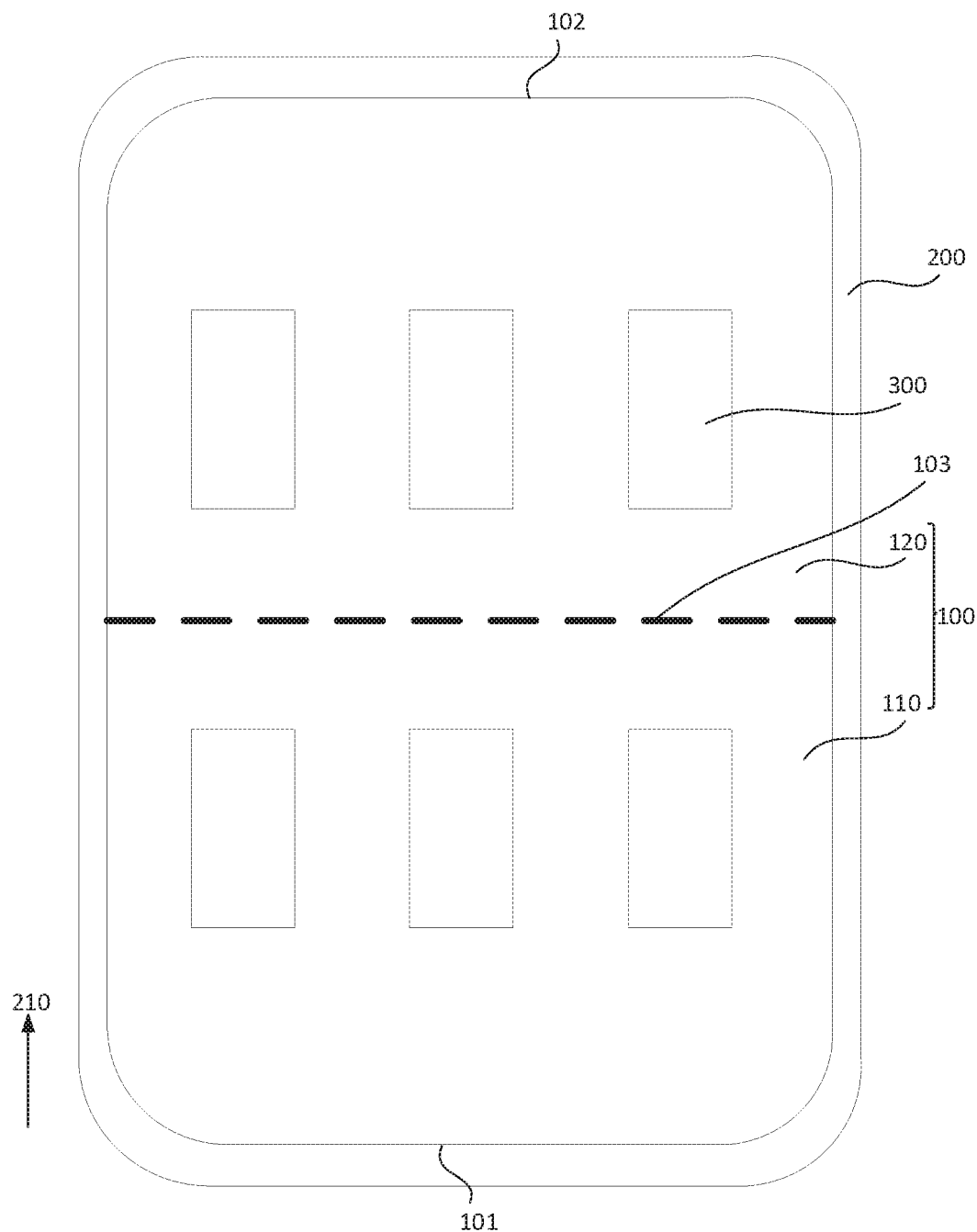
FIG. 3 is a structural diagram of another display panel according to an embodiment of the present disclosure.

FIG. 3 is a structural diagram of another display panel according to an embodiment of the present disclosure. Referring to FIG. 3, optionally, an edge of the display region 100 includes a first edge 101 and a second edge 102 disposed opposite to each other. At least two display sub-regions are sequentially arranged along a first direction 210 (in FIG. 3, a display sub-region 110 and a display sub-region 120 are exemplarily included in the display region and sequentially arranged along the first direction 210), and the fingerprint identification precisions of the display sub-regions are decreased or increased along the first direction 210. The first direction 210 is pointing from the first edge 101 towards the second edge 102. That is, among the display sub-regions, a display sub-region closest to the first edge 101 has the highest (or lowest) fingerprint identification precision, and a display sub-region closest to the second edge 102 has the lowest (or highest) fingerprint identification precision. Since the user is usually accustomed to holding a position, close to a bottom edge or a top edge, of the display panel, the high touch frequency region is close to a side edge of the display panel, and the farther the region is from this side edge, the lower the touch frequency is. The display panel is suitable to a situation in which the high touch frequency region is disposed close to the side edge of the display panel, so that when being operated by the user, the display panel may perform the fingerprint identification more easily, which facilitates the user to operate the display panel and improves the user experience.

In one embodiment, the display sub-region is provided with multiple fingerprint identification units. In one example of this embodiment, the multiple fingerprint identification units in the same display sub-region have a same fingerprint identification precision. In another example of this embodiment, the multiple fingerprint identification units in the same display sub-region are arranged in the first direction, and the fingerprint identification precisions of the multiple fingerprint identification units are in an ascending order or a descending order in the first direction, avoiding disorder of the fingerprint identification precisions.

In another embodiment, each display sub-region is provided with only one fingerprint identification unit. Multiple display sub-regions are arranged in the first direction, the fingerprint identification precisions of their fingerprint identification units are in an ascending order or a descending order in the first direction.

Optionally, as shown in FIG. 3, the display region 100 of the display panel is divided into two parts, an edge of one part is the first edge 101, and an edge of the other part is the second edge 102. That is, the display region 100 includes the display sub-region 110 and the display sub-region 120 that are sequentially arranged along the first direction 210. An edge of the display sub-region 110 includes the first edge 101, and an edge of the display sub-region 120 includes the second edge 102. Optionally, in the embodiment, a boundary line 103 (indicated by a dashed line in FIG. 3) between the display sub-region 110 and the display sub-region 120 is parallel to the first edge 101 or the second edge 102. Optionally, the boundary line 103 between the display sub-region 110 and the display sub-region 120 is located in the middle of the display region 100, such as locating on the a symmetry axis of the display region 100. A distance between the boundary line 103 and the first edge 101 is the same as a distance between the boundary line 103 and the second edge 102, so the display sub-region 110 and the display sub-region 120 have the same area, thereby making the region with low fingerprint identification precision and low power consumption of the display panel and the region with high fingerprint identification precision and high power consumption of the same area. That is to say, a sufficient, continuous and complete region with high fingerprint identification precision in the display region is ensured, which ensures the high fingerprint identification precision of the display panel to accurately identify the target with a large area, and also ensures that a sufficient region is achieved to reduce the fingerprint identification precision to meet the requirement of reducing the power consumption.

Of course, in other optional embodiments of the present disclosure, the boundary line 103 of each display sub-region may be in other shapes, such as in the shape of a wave, a zigzag, etc. The boundary line 103 of each display sub-region may also be closer to the first edge 101 than the second edge 102, or closer to the second edge 102 than the first edge 101, or passing through the geometric center of the display region 100, or the like, which is not limited in the present disclosure. In order to clearly show different display sub-regions of the display region 100 in figures, the present disclosure uses bold dashed lines to indicate the boundary lines between the different display sub-regions in the drawings corresponding to each embodiment.

Continually referring to FIG. 3, on the basis of the above technical solutions, the first edge 101 may be disposed at the bottom edge of the picture displayed by the display region 100, and the second edge 102 may be disposed at the top edge of the screen displayed by the display region 100. The fingerprint identification precisions of the display sub-regions are decreased along the first direction 210, where the first direction 210 is pointing from the first edge 101 towards the second edge 102. That is, among the display sub-regions, the display sub-region closest to the bottom edge of the display picture has the highest fingerprint identification precision, and the display sub-region closest to the top edge of the display picture has the lowest fingerprint identification precision. Since the user is usually accustomed to holding the position close to the bottom edge of the display picture, the high touch frequency region is disposed in the region at the bottom edge of the display picture. The display panel configured in the above manner is suitable to a situation in which the high touch frequency region is disposed close to the bottom edge of the display picture, so that when being operated by the user, the display panel may perform the fingerprint identification more easily, which facilitates the user to operate the display panel and improves the user experience.

Figure 4:
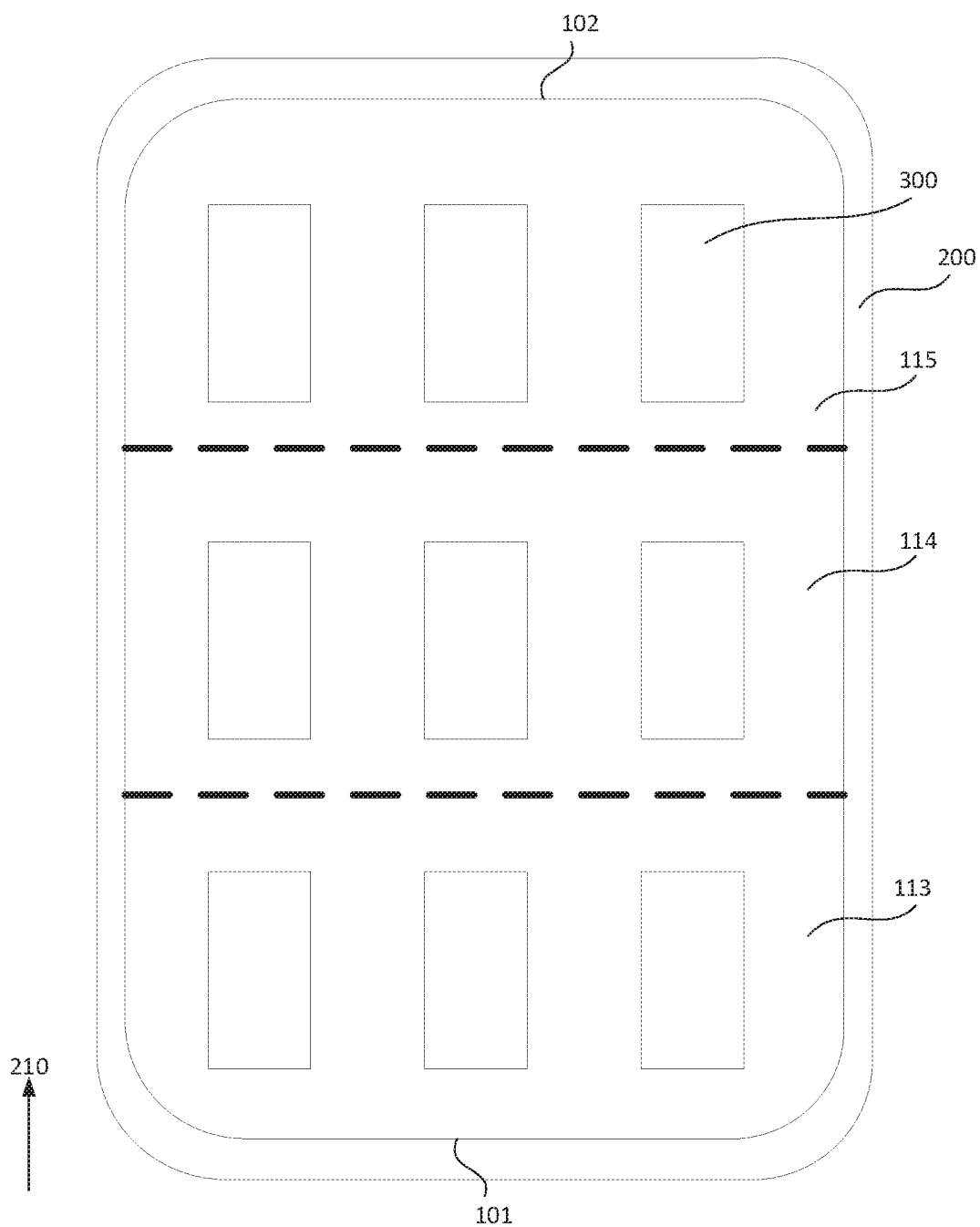
FIG. 4 is a structural diagram of another display panel according to an embodiment of the present disclosure.

FIG. 4 is a structural diagram of another display panel according to an embodiment of the present disclosure. Referring to FIG. 4, on the basis of the above technical solutions, the at least two display sub-regions may include a third display sub-region 113, a fourth display sub-region 114 and a fifth display sub-region 115. The third display sub-region 113, the fourth display sub-region 114 and the fifth display sub-region 115 are sequentially arranged along a first direction 210. Fingerprint identification precision of the third display sub-region 113 is higher than fingerprint identification precision of the fifth display sub-region 115; and fingerprint identification precision of the fourth display sub-region 114 is between the fingerprint identification precision of the third display sub-region 113 and the fingerprint identification precision of the fifth display sub-region 115. The fourth display sub-region 114 serves as a transition region for the third display sub-region 113 and the fifth display sub-region 115. Since different users may correspond to different high touch frequency regions, a touch body 800 may be located outside an estimated high touch frequency region, and has higher touch frequency in a position close to the high touch frequency region than in a position away from the high touch frequency region. Therefore, the display panel is provided with the fourth display sub-region 114 to improve the fingerprint identification precision and fault tolerance performance of the display panel, so that when being operated by the user, the display panel may perform the fingerprint identification more easily, which facilitates the user to operate the display panel and improves the user experience.

Figure 5:
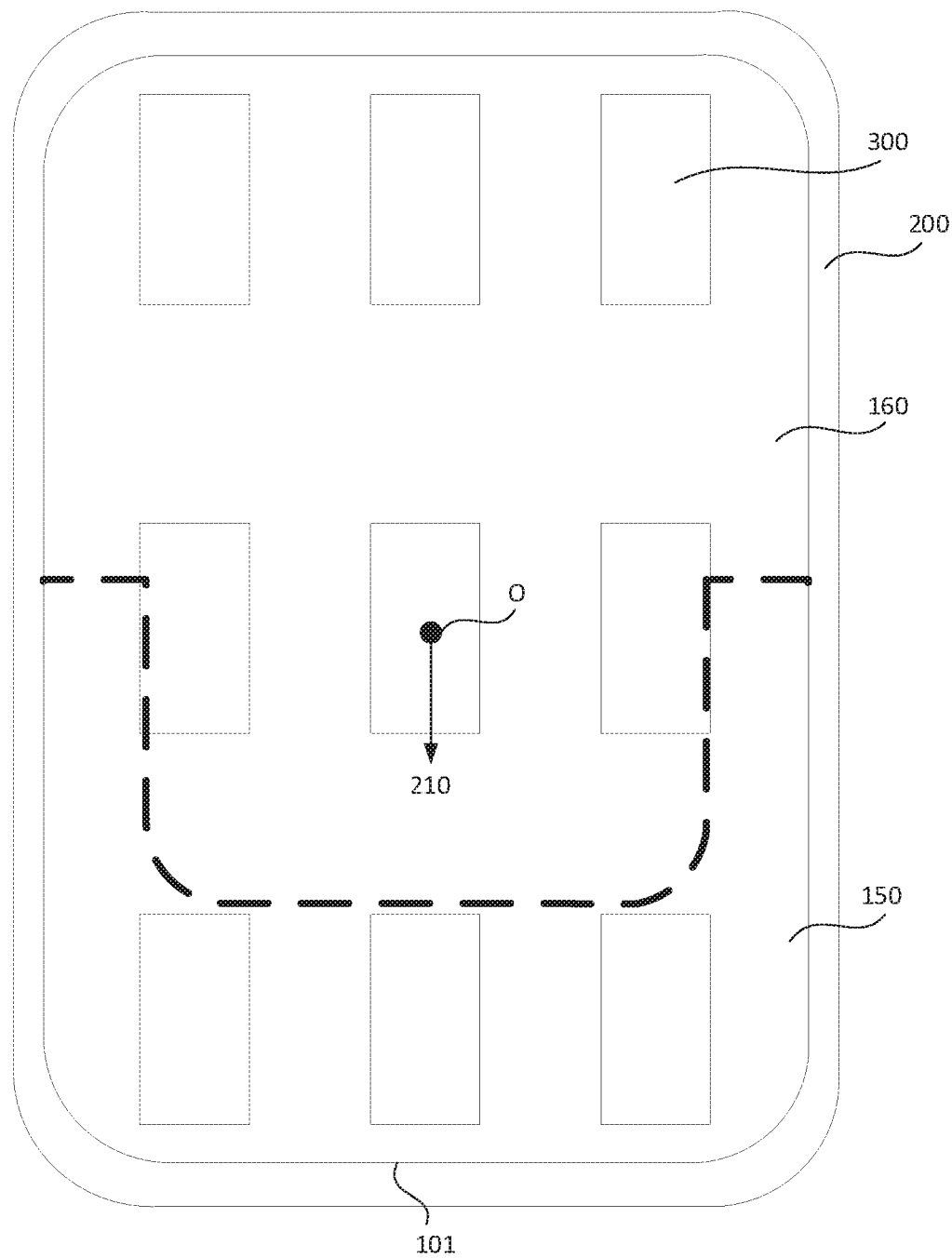
FIG. 5 is a structural diagram of another display panel according to an embodiment of the present disclosure.

Optionally, FIG. 5 is a structural diagram of another display panel according to an embodiment of the present disclosure. Referring to FIG. 5, at least two display sub-regions are sequentially arranged along the first direction 210 (in FIG. 5, the at least two display sub-regions exemplarily include a display sub-region 150 and a display sub-region 160 which are sequentially arranged along the first direction 210), and the fingerprint identification precisions of the display sub-regions are decreased or increased along the first direction 210. The first direction 210 is pointing from a center O of the display region 100 to the edge of the display region 100. Exemplarily, in FIG. 5, the first direction 210 is pointing from the center O of the display region 100 to a first edge 101, and the display sub-region 150 is disposed in a region close to the first edge 101 of the display panel. The center O of the display region 100 may be the geometric center of the display panel. Since the user is accustomed to operating the display panel with one hand, the high touch frequency region operated by the left hand and the high touch frequency region by the right hand are symmetric about the center of the display panel. The display panel configured in the above manner can provide a high-precision fingerprint identification for both the situation that the user operates the display panel with the left hand and the situation that the user operates the display panel with the right hand, so that when being operated by the user, the display panel may perform the fingerprint identification more easily, which facilitates the user to operate the display panel and improves the user experience.

Continually referring to FIG. 5, on the basis of the above solutions, the fingerprint identification precisions of the display sub-regions are increased along the first direction 210. The fingerprint identification precision of the display sub-region 150 is higher than the fingerprint identification precision of the display sub-region 160, that is, the fingerprint identification precision of the region close to the first edge 101 of the display panel is higher than the fingerprint identification precision of the other regions of the display panel. Since different users have different operating habits, in the edge region of the display panel, a part of the touch body 800 may possibly be located outside the display region 100 of the display panel. Accordingly, when the touch body 800 is placed in the edge region of the display panel, the fingerprint identification is difficult to perform. The fingerprint identification precisions of the display sub-regions of the display panel are increased along the first direction 210 which is pointing from the center O of the display region 100 to the edge of the display region 100, so that the fingerprint identification precision of the edge region of the display panel is higher, thereby further improving the fingerprint identification precision of the display panel without increasing the power consumption.

Figure 6:
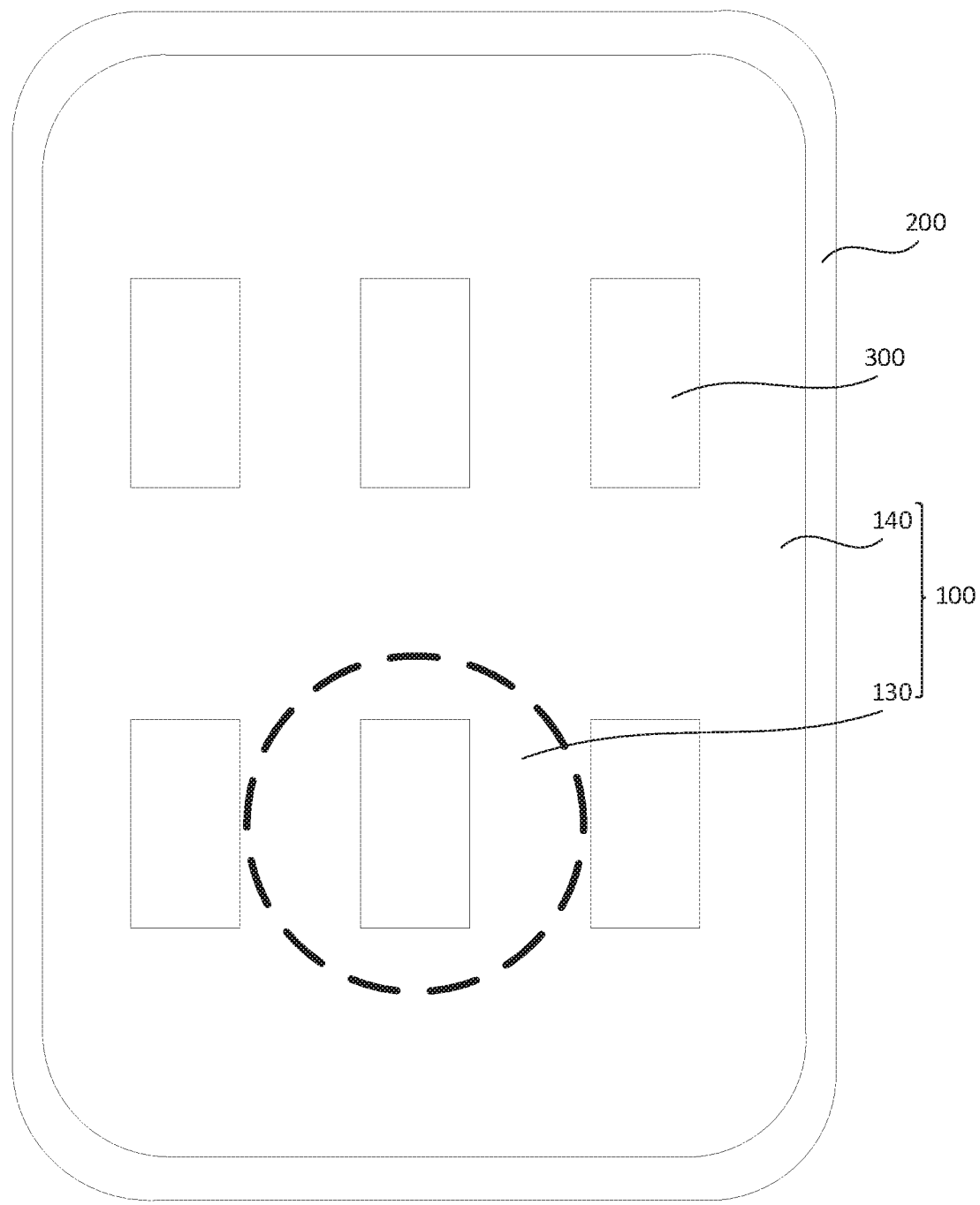
FIG. 6 is a structural diagram of another display panel according to an embodiment of the present disclosure.

FIG. 6 is a structural diagram of another display panel according to an embodiment of the present disclosure. Referring to FIG. 6, optionally, the at least two display sub-regions include a first display sub-region 130 and a second display sub-region 140. The second display sub-region 140 surrounds the first display sub-region 130, and the fingerprint identification precision of the first display sub-region 130 is different from the fingerprint identification precision of the second display sub-region 140. Optionally, the fingerprint identification precision of the first display sub-region 130 is higher than the fingerprint identification precision of the second display sub-region 140. As may be seen from FIG. 6, the first display sub-region 130 is surrounded by the second display sub-region 140, so the first display sub-region 130 is disposed in the middle of the display panel. Therefore, the first display sub-region 130 is a high touch frequency region. For example, icons are in the first display sub-region 130 of the display region 100, and the second display sub-region 140 surrounds icons in the display region 100. It is to be understood that the icon in the display region is displayed in the display region 100 and the display content of the display region 100 is changed after the icon is clicked, such as an APP icon, a menu option, a key, a soft keyboard, and the like. The fingerprint identification precision of the first display sub-region 130 is set to be higher than the fingerprint identification precision of the second display sub-region 140, so that when being operated by the user, the display panel may perform the fingerprint identification more easily, which facilitates the user to operate the display panel and improves the user experience.

In a practical application, optionally, the fingerprint identification precision of the second display sub-region 140 may be set to be higher than the fingerprint identification precision of the first display sub-region 130, that is, the region with high fingerprint identification precision is disposed at the edge of the display panel. The situation in which the high touch frequency region is disposed at the edge of the display panel, for example, is that when the user operates a tablet PC with one hand, the finger touches the edge position of the display panel with a higher frequency. Therefore, the display panel configured in the above manner is suitable to a situation in which the high touch frequency region is disposed at the edge of the display panel, so that when being operated by the user, the display panel may perform the fingerprint identification more easily, which facilitates the user to operate the display panel and improves the user experience.

Optionally, in this embodiment, the first display sub-region 130 is circular. Of course, in other optional embodiments of the present disclosure, the first display sub-region may be in other shapes as needed, such as a rectangle, a diamond, a trapezoid, a rounded rectangle, a polygon, an ellipse, or other shapes that match the icon graph.

On the basis of the above technical solutions, with continued reference to FIG. 6, optionally, a distance from the first display sub-region 130 to a bottom edge of a display picture displayed by the display region 100 is smaller than a distance from the first display sub-region 130 to a top edge of a picture displayed by the display region 100. Different users have different operating habits. When using a mobile display device such as a mobile phone, the user grabs the mobile display device and then uses a finger such as a thumb to perform touch operations, such as sliding the pictures displayed by the mobile phone, unlocking, etc. The movement of the finger is generally within the range of the middle and lower part of the display picture, and in a circular, elliptical or rounded rectangular region, which ensures that the user can operate the display device with the finger while stably grabbing the display device with the user's hand, avoids the finger from blocking the center of the display region. The center of the display region is generally the center of the displayed picture and usually is where the main content of the picture is displayed. Moreover, keeping the movement of the finger within the range of the middle and lower part of the display picture avoids the finger from sliding out of the picture and failed touch operations. Therefore, the touch mainly occurs on the a part of the display region close to the edge of the display region. This embodiment further improves the fingerprint identification sensitivity when the user operates the display panel, so that when being operated by the user, the display panel may perform the fingerprint identification more easily, which facilitates the user to operate the display panel and improves the user experience.

Optionally, the display panel is a full-screen display panel, the display region includes a Home key region, and the first display sub-region overlaps with the Home key region of the display region, or the first display sub-region covers the Home key region of the display region, thereby improving the fingerprint identification sensitivity when the user operates the display panel, so that when being operated by the user, the display panel may perform the fingerprint identification more easily, which facilitates the user to operate the display panel and improves the user experience.

It is to be noted that in practical applications, technical solutions provided by the present disclosure may be arbitrarily combined as required, and one of the combinations will be described below but is not intended to limit the present disclosure.

Figure 7:
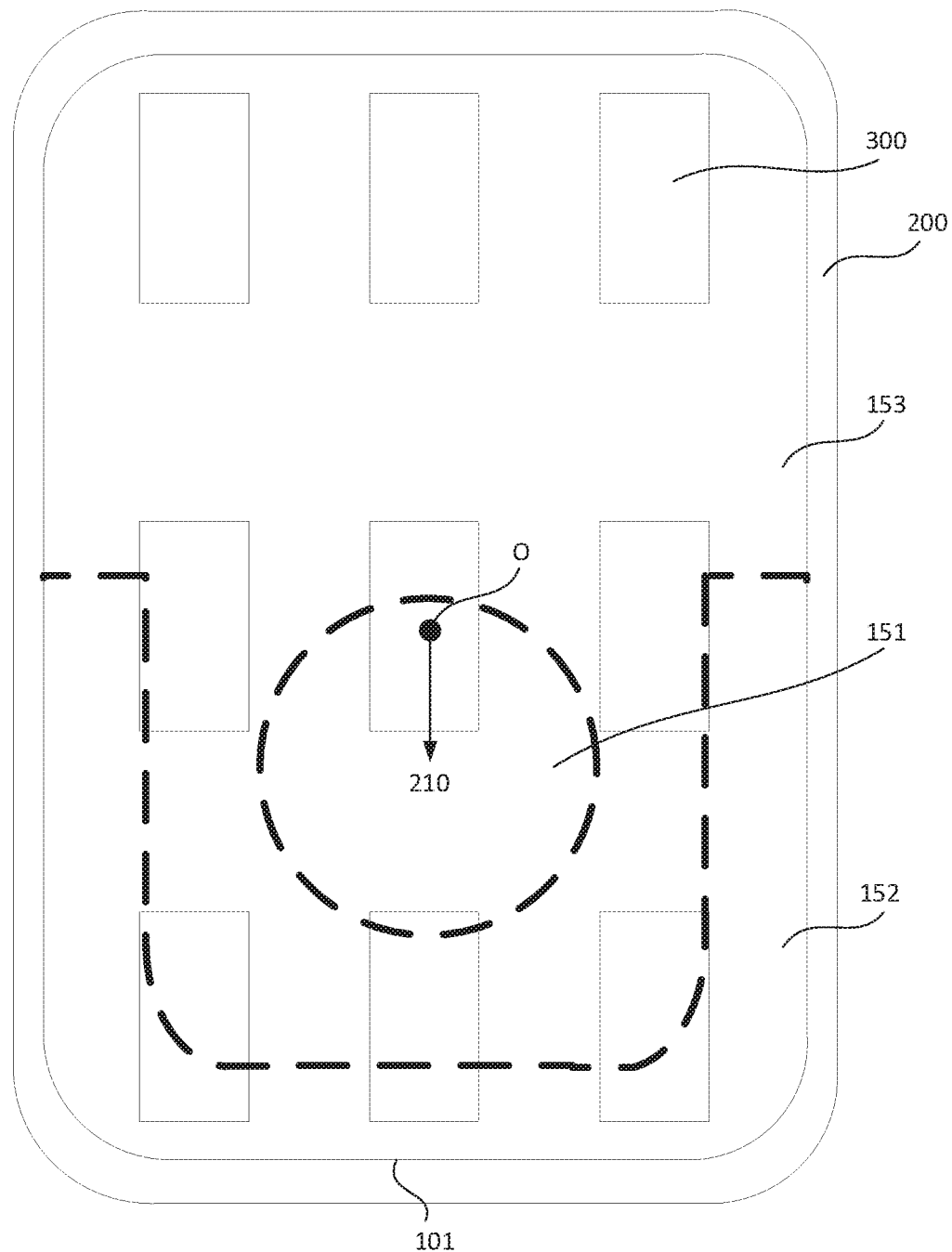
FIG. 7 is a structural diagram of another display panel according to an embodiment of the present disclosure.

FIG. 7 is a structural diagram of another display panel according to an embodiment of the present disclosure. Referring to FIG. 7, on the basis of the above technical solutions, the display panel includes a display sub-region 151, a display sub-region 152 and a display sub-region 153. A distance from the display sub-region 151 to a bottom edge of a picture displayed by a display region 100 is smaller than a distance from the display sub-region 151 to a top edge of the picture displayed by the display region 100. The display sub-region 152 includes a region close to the bottom edge of the display picture and regions on two side edges of the lower part of the display picture. The display sub-region 153 is the remaining part of the display region 100 removing the display sub-region 151 and the display sub-region 152. The fingerprint identification precision of the display sub-region 151 and the fingerprint identification precision of the display sub-region 152 are both higher than the fingerprint identification precision of the display sub-region 153. It can be seen from the foregoing analysis that the display sub-region 151 and the display sub-region 152 are both disposed at a lower part of the display panel. The lower part of the display panel is a high touch frequency region. The high touch frequency region is further divided into a high-precision fingerprint identification region (the display sub-region 151 and the display sub-region 152) and a low-precision fingerprint identification region (a part of the display sub-region 153), which can not only satisfy a situation in which the high touch frequency region is disposed in the middle of the display panel, but also improve the fingerprint identification precision of the edge region of the display panel where the touch body may be placed, thereby further improving the fingerprint identification precision of the high touch frequency region, reducing the power consumption of the display panel, and improving the quality of the display panel.

On the basis of the above technical solutions, various ways exist for configuring the fingerprint identification precisions of at least two display sub-regions. Several typical setting ways of implementing different fingerprint identification precisions on the display panel are described below, but the present disclosure is not limited thereto.

Optionally, at least two display sub-regions are different in the density of fingerprint identification units 300, and therefore the at least two display sub-regions are different in fingerprint identification precision. The density of fingerprint identification units is the number of the fingerprint identification units per unit area of the display sub-region. That is, the density of fingerprint identification units in the display sub-region with high fingerprint identification precision is high, and the density of fingerprint identification units in the display sub-region with low fingerprint identification precision is low. The higher the density of fingerprint identification units 300 of the display sub-region is, the larger the power consumption of the display sub-region is, and the larger the number of signal lines used for transmitting data in the display sub-region is. The above configuration in which at least two display sub-regions are different in the density of fingerprint identification units 300, further reduces the power consumption of the entire display panel and the noise interference of the signal lines, and improves the quality of the display panel.

Optionally, the densities of the fingerprint identification units 300 in the display sub-regions are different, and the fingerprint identification precision of each fingerprint recognition unit 300 in each display sub-region is the same, so as to ensure that the display sub-region in which the fingerprint identification units 300 have a greater density has a high fingerprint identification precision, and the display sub-region in which the fingerprint identification units 300 have a lower density has a low fingerprint identification precision.

Figure 8:
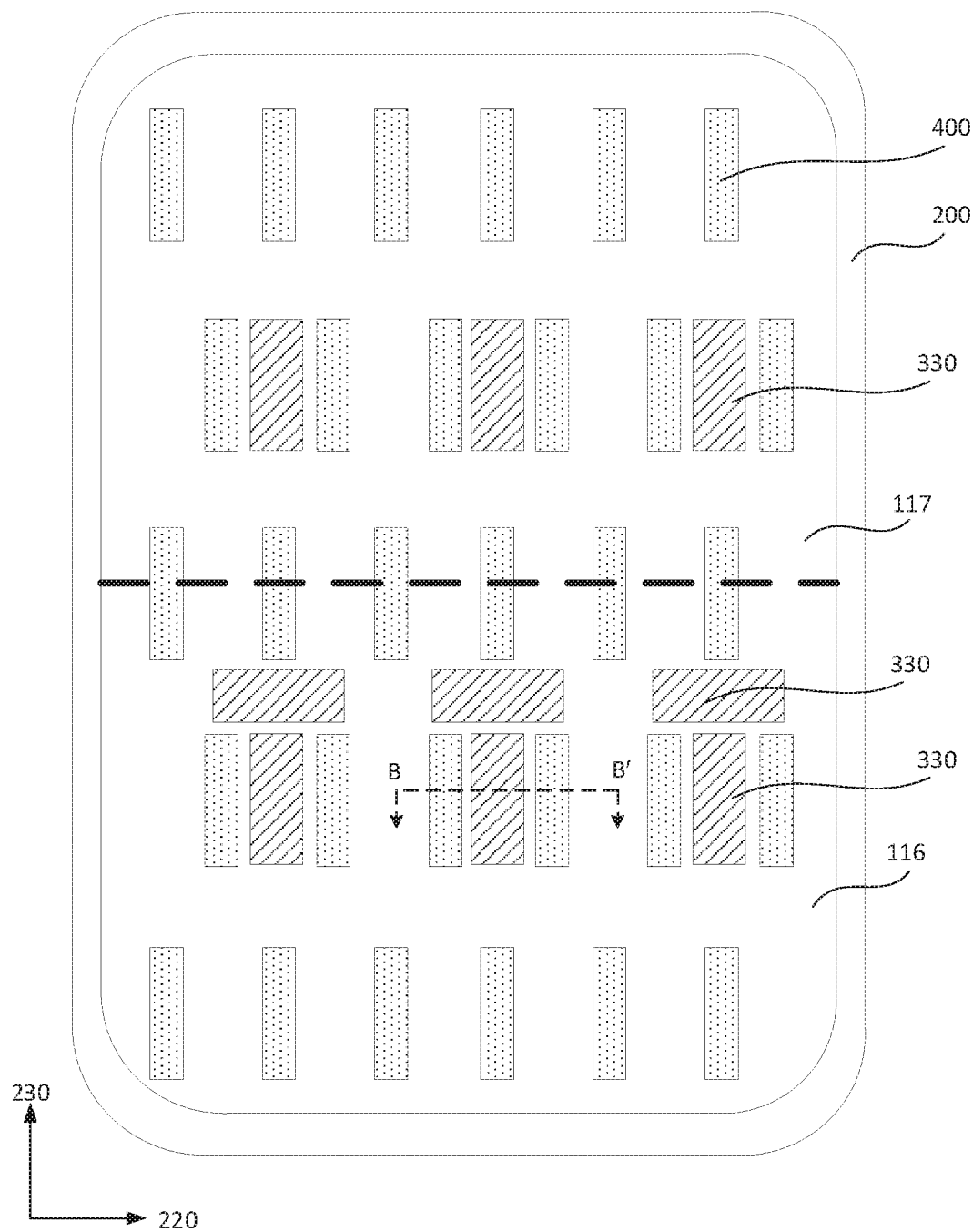
FIG. 8 is another structural diagram of another display panel according to an embodiment of the present disclosure.
Figure 9:
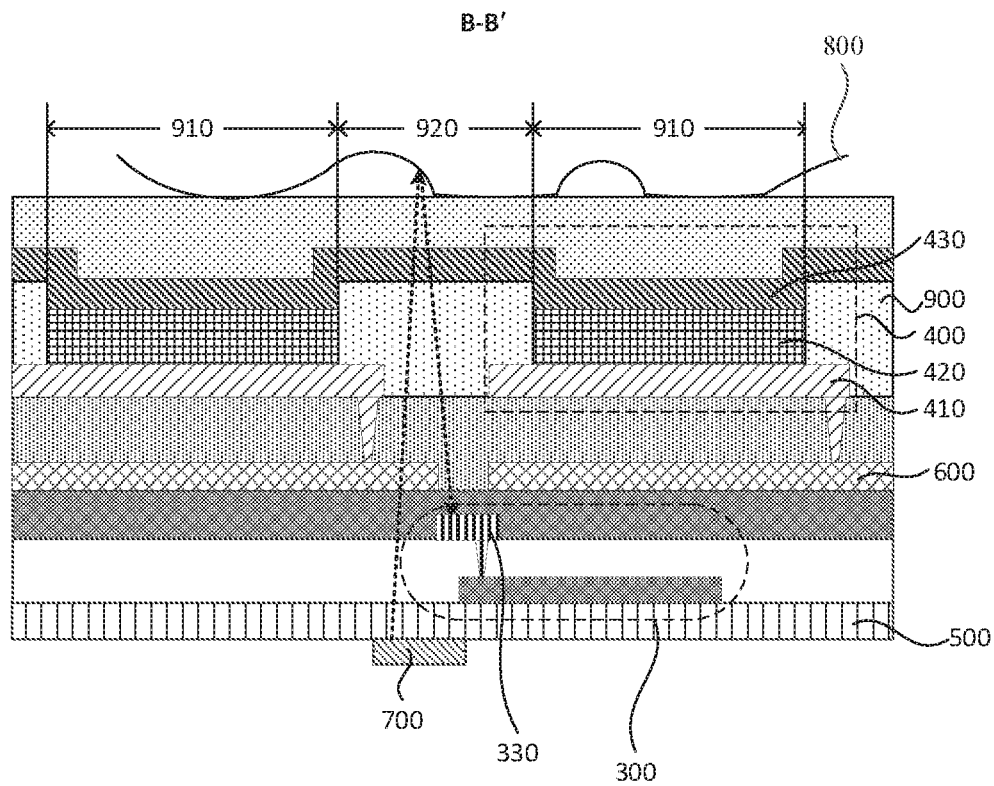
FIG. 9 is a cross-sectional view of the display panel taken along a line B-B' in FIG. 8.

Specifically, FIG. 8 is a structural diagram of another display panel according to an embodiment of the present disclosure, and FIG. 9 is a cross-sectional view of the display panel taken along a line B-B' in FIG. 8. Referring to FIGS. 8 and 9, the display panel further includes: a plurality of pixel units 400 arranged in an array on a side of a base substrate 500. The fingerprint identification unit 300 includes at least one photosensor 330. The at least two display sub-regions at least include a sixth display sub-region 116 and a seventh display sub-region 117, and the fingerprint identification precision of the sixth display sub-region 116 is higher than the fingerprint identification precision of the seventh display sub-region 117. In the sixth display sub-region 116, the vertical projection of at least one of the photosensors 330 on the base substrate 500 is located between pixel units 400 adjacent in a second direction 220 and between pixel units 400 adjacent in a third direction 230. And in the seventh display sub-region 117, the vertical projection of at least one of the photosensors 330 on the base substrate 500 is located between pixel units 400 adjacent in the second direction 220. The second direction 220 and the third direction 230 are parallel to a plane where the display panel is located and intersect each other. The photosensor 330 converts light reflected by a touch body 800 into a current signal.

It is to be noted that exemplarily, in this embodiment of the present disclosure, the third direction 230 is the same as the first direction 210 in FIG. 4, but in other embodiments, the third direction 230 may be different from the first direction 210, which is not limited in the present disclosure. It is to be noted that various ways for arranging the photosensor 330 are exemplarily illustrated in the present disclosure and are not intended to limit the present disclosure. The photosensors 330 may be disposed in the sixth display sub-region 116. The vertical projection of at least one of the photosensors 330 in the sixth display sub-region 116 on the base substrate 500 may further be located between pixel units 400 adjacent in the second direction 220 and between pixel units 400 adjacent in the third direction 230. The way of arranging the photosensors 330 in the seventh display sub-region 117 is not limited in the present disclosure, as long as the fingerprint identification precision of the sixth display sub-region 116 is higher than the fingerprint identification precision of the seventh display sub-region 117, which is within the protection scope of the present disclosure. In the seventh display sub-region 117, the vertical projection of at least one of the photosensors 330 on the base substrate 500 may be located between the pixel units 400 adjacent in the second direction 220. The way of arranging the photosensors 330 in the sixth display sub-region 116 is not limited in the present disclosure, as long as the fingerprint identification precision of the sixth display sub-region 116 is higher than the fingerprint identification precision of the seventh display sub-region 117, which is within the protection scope of the present disclosure.

Since the pixel unit 400 includes opaque metal films, arranging the photosensors 330 between the pixel units 400 may avoid the light reflected by the touch body 800 from being blocked by the metal films in the pixel unit 400, thereby improving the fingerprint identification precision of the display panel.

Optionally, a display panel including six fingerprint identification units 300 is taken as an example in this embodiment of the present disclosure, but in practice, for implementing fingerprint identification, the fingerprint identification units 300 and the pixel units 400 are of the same order of magnitude. For example, the fingerprint identification units 300 and the pixel units 400 are both of the order of magnitude of a million, and the number of the pixel units 400 of a display panel is greater than one million, therefore, the number of the fingerprint identification units 300 of a display panel is also greater than one million. If a display sub-region has an area one tenth of the entire display region, the fingerprint identification units 300 are of the order of magnitude of at least a hundred thousand, and the number of the fingerprint identification units 300 is greater than a hundred thousand. Of course, according to design needs and process limitations, the number of fingerprint identification units is allowed to vary within a certain range.

On the basis of the above technical solutions, with continued reference to FIG. 9, the display panel further includes a pixel defining layer 900 and pixel driving circuits 600. The pixel defining layer 900 includes a plurality of opening regions 910 and a plurality of non-opening regions 920, and the opening regions 910 are alternately arranged with the non-opening regions 920. The pixel driving circuit 600 provides a driving current for the pixel unit 400 which drives the pixel unit 400 to emit light. The pixel unit 400 includes a first electrode 410, a light emitting layer 420 and a second electrode 430 which are sequentially stacked, and the first electrode 410 is disposed between the pixel driving circuit 600 and the light emitting layer 420. The first electrode 410 of the pixel unit 400 is electrically connected to a signal output end of the corresponding pixel driving circuit 600 through a via hole through which the driving current is provided for the pixel unit 400.

With continued reference to FIG. 9, exemplarily, the display panel includes the base substrate 500, the fingerprint identification units 300, a light source 700, the pixel defining layer 900, the pixel driving circuits 600 and the pixel units 400. The light source 700 is disposed on a side of the base substrate 500, and the fingerprint identification units 300 are disposed on a side, facing away from the light source 700, of the base substrate 500. The pixel driving circuits 600 are disposed on a side, facing away from the base substrate 500, of the fingerprint identification units 300, and the pixel defining layer 900 is disposed on a side, facing away from the base substrate 500, of the pixel driving circuits 600. The pixel defining layer 900 includes the plurality of opening regions 910 and the plurality of non-opening regions 920, where the opening regions 910 are arranged alternately with the non-opening regions 920, and the pixel units 400 are disposed in the opening regions 910 of the pixel defining layer 900, respectively.

In the above technical solutions, with continued reference to FIG. 9, the region between adjacent pixel units 400 specifically refers to the non-opening region 920 of the pixel defining layer 900. Alternatively, the region between the adjacent pixel units 400 specifically refers to a region between vertical projections of the light emitting layers 420 on the base substrate 500. In FIG. 9, exemplarily, the non-opening regions 920 coincide with regions between vertical projections of the light emitting layers 420 on the base substrate 500.

It is to be noted that the display panel exemplarily illustrated in FIGS. 2 and 9 is an organic light emitting diode display panel, but the present disclosure is not limited to the organic light emitting diode display panel. The display panel in the present disclosure may be a liquid crystal display panel or an electronic paper. The fingerprint identification units 300 in FIGS. 2 and 9 are disposed between the pixel driving circuits 600 and the base substrate 500, which is not intended to limit the present disclosure, for example, the fingerprint identification units 300 may be disposed on a side, facing away from the base substrate 500, of the pixel units 400. The fingerprint identification unit may be disposed at a position as needed.

Optionally, the precisions of fingerprint identification units 300 in at least two display sub-regions are different, which may implement different fingerprint identification precisions in the at least two display sub-regions. That is, the fingerprint identification unit 300 with low fingerprint identification precision is used in the display sub-region with low fingerprint identification precision, and the fingerprint identification unit 300 with high fingerprint identification precision is used in the display sub-region with high fingerprint identification precision.

Optionally, fingerprint identification precisions of the fingerprint identification units 300 in the display sub-regions are different, and the density of the fingerprint recognition units 300 in the display sub-regions are the same, to ensure that the display sub-region in the high touch frequency region has a high fingerprint identification precision, and the display sub-region in the low touch frequency region has a low fingerprint identification precision.

Optionally, this embodiment may be combined with any embodiment of the present disclosure, which is not limited in the present disclosure. For example, in the high touch frequency region, the density of the fingerprint identification units is set to be high, and the precision of each fingerprint identification unit is set to be high; and in the low touch frequency region, the density of the fingerprint identification units is set to be low, and the precision of each fingerprint identification unit is set to be low. With the display panel configured in such a manner, the fingerprint identification precision of the high touch frequency region is further increased to improve the user experience, and the fingerprint identification precision of the low touch frequency region is further reduced to reduce the power consumption of the display panel.

Figure 10:
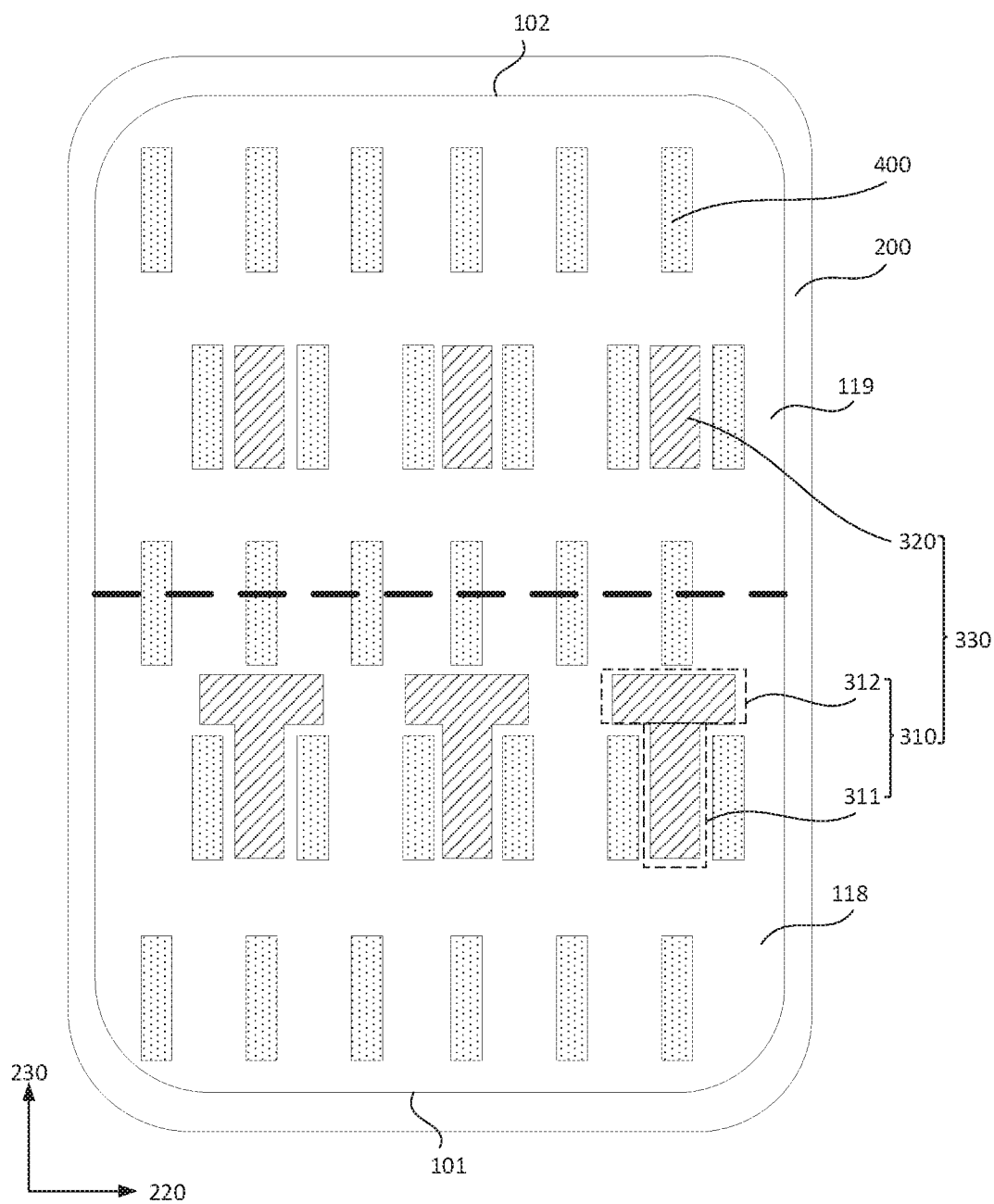
FIG. 10 is a structural diagram of another display panel according to an embodiment of the present disclosure.

FIG. 10 is a structural diagram of another display panel according to an embodiment of the present disclosure. Referring to FIG. 10, optionally, the fingerprint identification unit 300 includes at least one photosensor 330. The at least two display sub-regions at least include an eighth display sub-region 118 and a ninth display sub-region 119, and the fingerprint identification precision of the eighth display sub-region 118 is higher than the fingerprint identification precision of the ninth display sub-region 119. The photosensor 330 in the eighth display sub-region 118 has a larger area than the photosensor 330 in the ninth display sub-region 119. With increased area of the photosensor 330 in the fingerprint identification unit 300, the light flux of the light reflected by a touch body 800 received by the photosensor 330 is increased, and the current signal generated by the photosensor 330 is increased, thereby facilitating an improvement of the fingerprint identification precision of the fingerprint identification unit 300. On the basis of the above technical solutions, continually referring to FIG. 10, in the eighth display sub-region 118, at least one fingerprint identification unit 300 includes a first photosensor 310 including a first part 311 and a second part 312 that are connected. The first part 311 is disposed between pixel units 400 adjacent in a second direction 220, and the second part 312 is disposed between pixel units 400 adjacent in a third direction 230. In the ninth display sub-region 119, at least one fingerprint identification unit 300 includes a second photosensor 320 disposed between the adjacent pixel units 400 in the second direction 220. The second direction 220 and the third direction 230 are parallel to a plane where the display panel is located and intersect each other. Since the pixel unit 400 typically includes opaque metal film layers, setting the photosensor 330 between the pixel units 400 may avoid light reflected by the touch body 800 from being blocked by the metal film layers in the pixel unit 400. In addition, the first photosensor 310 includes the first part 311 and the second part 312 that are connected, further increasing an area of the photosensor 330 and improving the fingerprint identification precision of the fingerprint identification unit 300.

Figure 11:
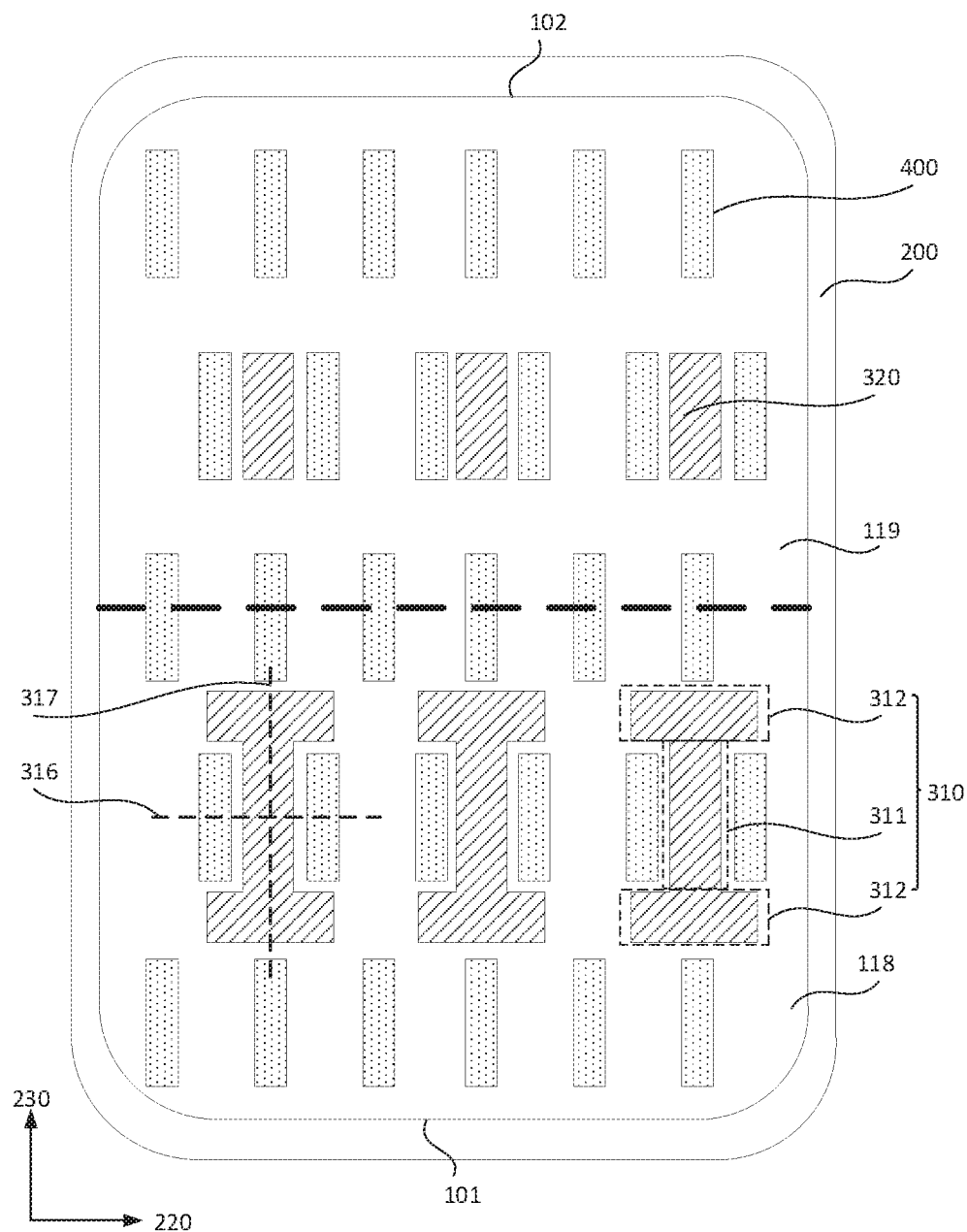
FIG. 11 is a structural diagram of another display panel according to an embodiment of the present disclosure.
Figure 12:
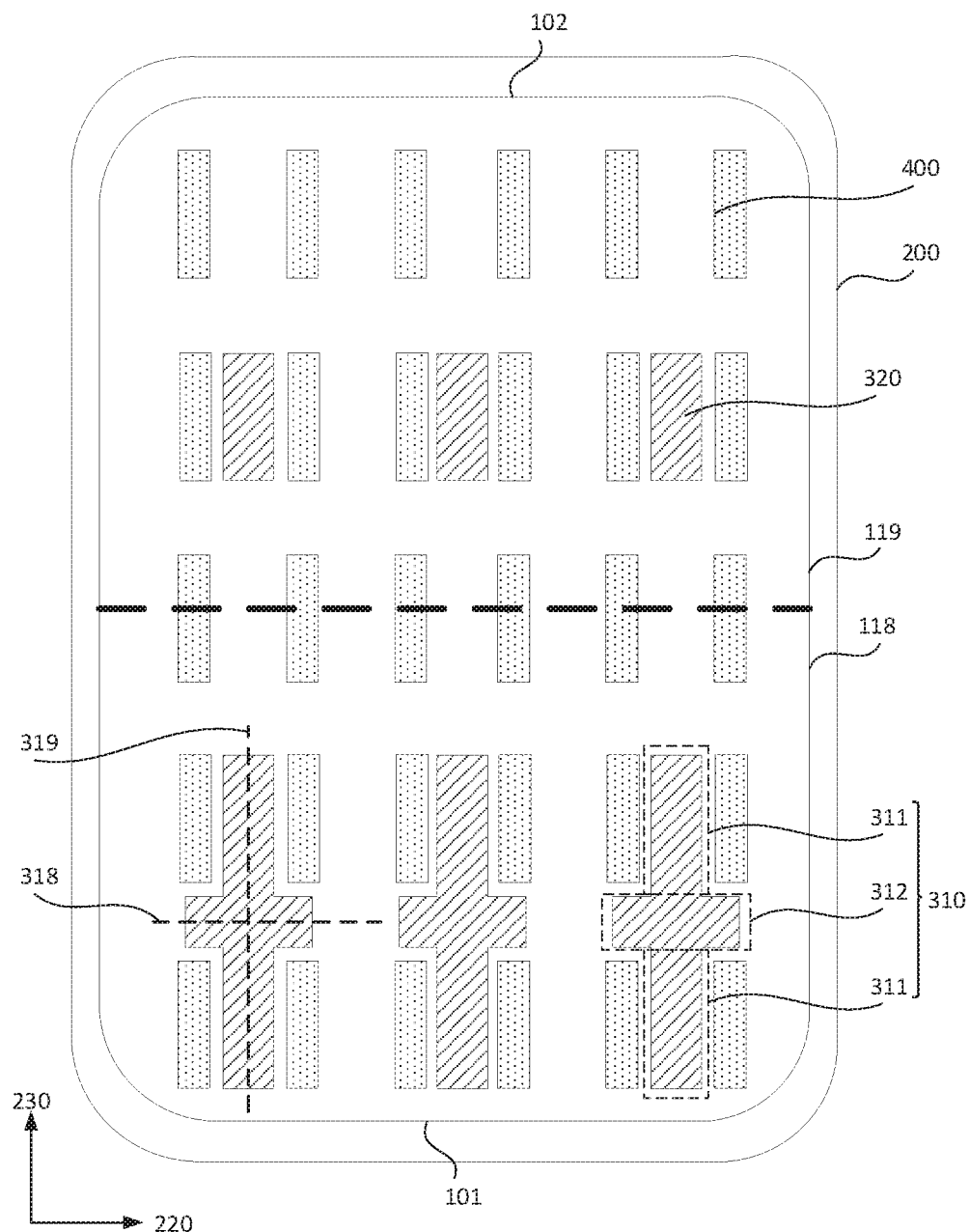
FIG. 12 is a structural diagram of another display panel according to an embodiment of the present disclosure.

In the above technical solutions, the first photosensor 310 may be in at least one of a "cross" shape, a "T" shape or an "I" shape so as to increase the area of the photosensor 330 and improve the fingerprint identification precision of the fingerprint identification unit 300. In FIG. 10, exemplarily, the first photosensor 310 is in the shape of a "T". FIG. 11 is a structural diagram of another display panel according to an embodiment of the present disclosure, and FIG. 12 is a structural diagram of another display panel according to an embodiment of the present disclosure. Exemplarily, the first photosensor 310 in FIG. 11 is in the shape of an "I" and the first photosensor 310 in FIG. 12 is in the shape of a "cross". With the first photosensor 310 configured in such a manner, the interval region between the adjacent pixel units 400 is fully utilized, the area of the photosensor 330 is increased and the fingerprint identification precision of the fingerprint identification unit 300 is improved.

With continued reference to FIGS. 11 and 12, the first photosensor 310 in the shape of an "I" shape and a "cross" may also be axially symmetric. In FIG. 11, the first photosensor 310 has a symmetry axis 316 in the second direction 220 and a symmetry axis 317 in the third direction 230. In FIG. 12, the first photosensor 310 has a symmetry axis 318 in the second direction 220 and a symmetry axis 319 in the third direction 230. Therefore, the first photosensor 310 has a uniform distribution in the first direction and the second direction, and the light received from the touch body 800 is more uniform, which improves the uniformity of the detection precision of the fingerprint identification unit 300.

Figure 13:
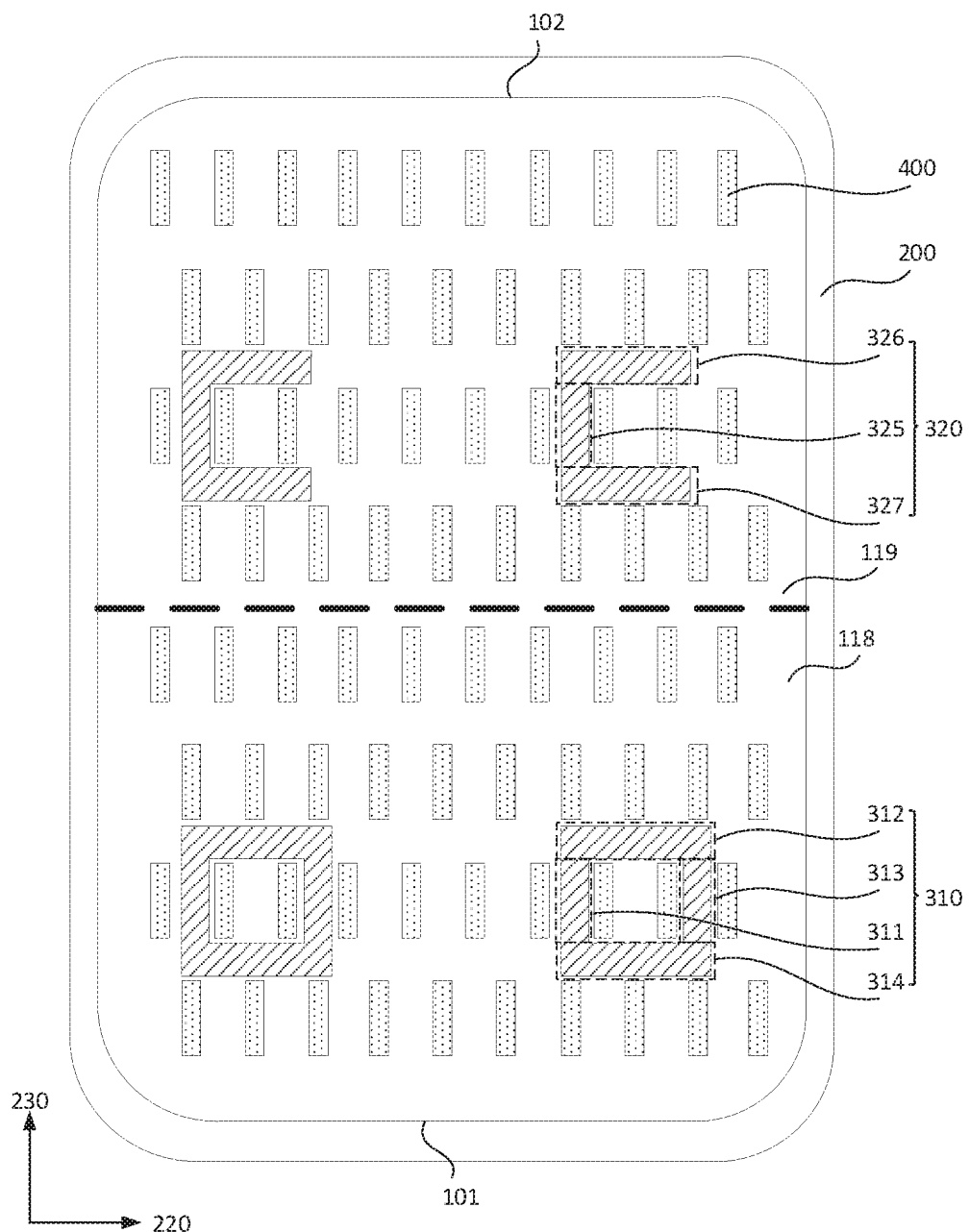
FIG. 13 is a structural diagram of another display panel according to an embodiment of the present disclosure.

FIG. 13 is a structural diagram of another display panel according to an embodiment of the present disclosure. Referring to FIG. 13, the first photosensor 310 further includes a third part 313 and a fourth part 314. The third part 313 is disposed between the pixel units 400 adjacent in the second direction 220, and the fourth part 314 is disposed between the pixel units 400 adjacent in the third direction 230. The first photosensor 310 composed of the first part 311, the second part 312, the third part 313 and the fourth part 314 is in a closed ring shape, and a vertical projection of at least one pixel unit 400 on the base substrate 500 is completely surrounded by a vertical projection of the first photosensor 310 on the base substrate 500. The second photosensor 320 further includes a fifth part 325, a sixth part 326 and a seventh part 327 that are connected to one another. The fifth part 325 is disposed between the pixel units 400 adjacent in the second direction 220. The sixth part 326 is disposed between the pixel units 400 adjacent in the third direction 230, and the seventh part 327 is disposed between the pixel units 400 adjacent in the third direction 230. The second photosensor 320 composed of the fifth part 325, the sixth part 326, and the seventh part 327 is in an unenclosed ring shape, and the vertical projection of at least one pixel unit 400 on the base substrate 500 is partially surrounded by a vertical projection of the second photosensor 320 on the base substrate 500. With the display panel configured in the above manner, the interval region between the adjacent pixel units 400 is fully utilized, and the area of the photosensor 330 is increased, thereby reducing the number of fingerprint identification units and fingerprint identification signal lines. On the basis of ensuring the fingerprint identification precision, the difficulty of arranging the wires of the display panel is reduced and the noise interference of the fingerprint identification signal lines to other signal lines on the display panel is also reduced.

On the basis of the above technical solutions, with continued reference to FIGS. 10-13, optionally, the photosensors 330 are arranged in an array, and the second direction 220 and the third direction 230 vertically intersect.

Figure 14:
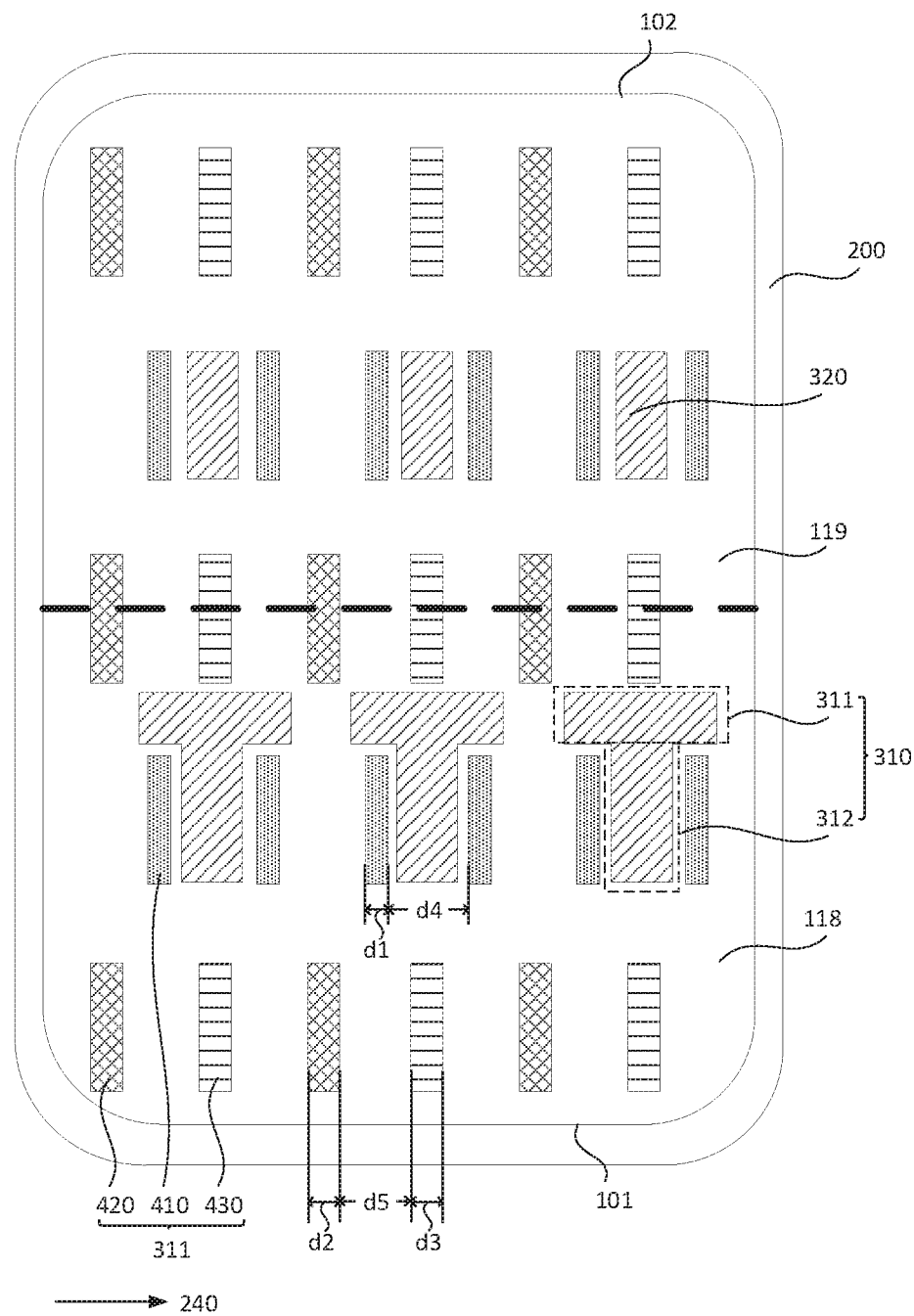
FIG. 14 is a structural diagram of another display panel according to an embodiment of the present disclosure.

FIG. 14 is a structural diagram of another display panel according to an embodiment of the present disclosure. Referring to FIG. 14, on the basis of the above technical solutions, the plurality of pixel units 400 include a first pixel unit 410, a second pixel unit 420 and a third pixel unit 430. In the fourth direction 240, a length d1 of the first pixel unit 410 is smaller than a length d2 of the second pixel unit 420 and a length d3 of the third pixel unit 430, and a distance d4 between the first pixel unit 410 and the adjacent pixel unit is greater than a distance d5 between the adjacent second pixel unit 420 and the third pixel unit 430. In the eighth display sub-region 118, a vertical projection of at least one photosensor 330 on the base substrate 500 is adjacent to the first pixel unit 410. That is, in this embodiment, the pixel units 400 are evenly arranged along a row direction (the fourth direction 240), and the distance between the centers of the adjacent pixel units 400 is the same. Since the pixel units of different colors have different lengths in the row direction, the adjacent pixel units of different colors have different intervals. Since the pixel units of different colors have different transmittance, the sizes of the first pixel unit 410 are smaller than the sizes of the second pixel unit 420 and the sizes of the third pixel unit 430, that is, the first pixel unit 410 having a higher transmittance has a smaller sizes, which is beneficial for balancing the luminance and display effects of the first pixel unit 410, the second pixel unit 420, and the third pixel unit 430. The vertical projection of the photosensor 330 on the base substrate 500 is configured to be adjacent to the first pixel unit 410 having small sizes, which is beneficial for further increasing an area of the first photosensor 310, improving the precision of the fingerprint identification unit 300 in the region with high fingerprint identification precision, and improving the user experience.

Figure 15:
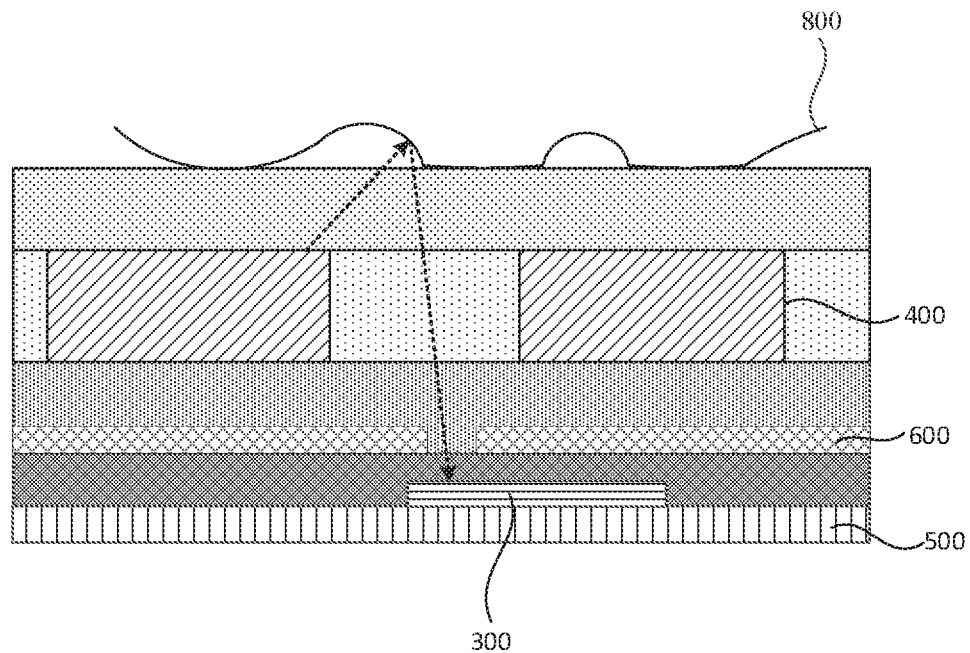
FIG. 15 is a cross-sectional view of another display panel according to an embodiment of the present disclosure.

On the basis of the above technical solutions, with continued reference to FIG. 14, optionally, the first pixel unit 410 is a green pixel, the second pixel unit 420 is a blue pixel, and the third pixel unit 430 is a red pixel. The green pixel is configured to emit a green light, the blue pixel is configured to emit a blue light, and the red pixel is configured to emit a red light. When the red light, green light, and blue light with different intensities are mixed, a full color display is achieved. FIG. 15 is a cross-sectional view of another display panel according to an embodiment of the present disclosure. Referring to FIG. 15, on the basis of the above technical solutions, the plurality of pixel units 400 include red pixels, green pixels, or blue pixels, and one or more of the plurality of pixel units 400 also serve as a light source for the fingerprint identification units 300. Each driving cycle of the display panel includes a display stage and a fingerprint identification stage. In the fingerprint identification stage, one or two types of the red, green and blue pixels emit light to serve as the light source for the touch body. With the display panel configured in such a manner, on one hand, the light source externally mounted on the display panel is not needed anymore, the thickness of the display panel is reduced, which is beneficial for making the display panel lighter and thinner; and on the other hand, the power consumption of the display panel in the fingerprint identification stage is increased since the pixel unit 400 emits light, and the larger the number of pixel units 400 which emit light in the fingerprint identification stage is, the larger the power consumption of the display panel is. One or two types of the red, green, or blue pixels are set to emit light and the other two or one types of pixels do not emit light, which is beneficial for reducing the power consumption of the display panel and further improving the user experience.

On the basis of the above technical solutions, with continued reference to FIG. 13, the pixel unit 400 is completely surrounded by the vertical projection of the first photosensor 310 on the base substrate 500, and the pixel units 400 is partially surrounded by the vertical projection of the second photosensor 320 on the base substrate 500 are first type pixel units. The first type pixel units 400 are one or two types of the red pixel, the green pixel or the blue pixel. The pixel unit 400 is also used as a light source of the fingerprint identification unit 300. Each driving cycle of the display panel includes a display stage and a fingerprint identification stage. In the fingerprint identification stage, the first type pixel units emit light so as to serve as a light source for the touch body. With the display panel configured in such a manner, the display panel is made lighter and thinner, and the power consumption of the display panel is reduced. In the fingerprint identification stage, the first type pixel unit is completely surrounded or is partially surrounded by the photosensor is configured to emit light, which is equivalent to setting the light source at a position close to the photosensor, so that the amount of the light signal of the light reflected by the touch body 800 and received by the photosensor is large, which is beneficial for improving the precision of the fingerprint identification unit 300 in the region with high fingerprint identification precision.

Figure 16:
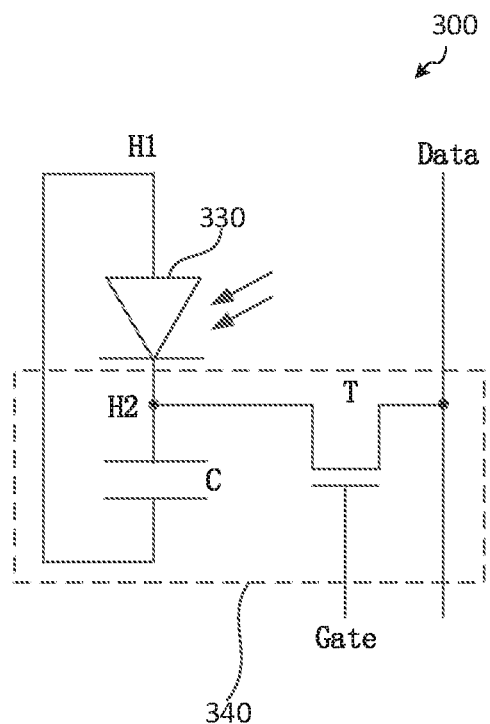
FIG. 16 is a circuit structural diagram of a fingerprint identification unit according to an embodiment of the present disclosure.
Figure 17:
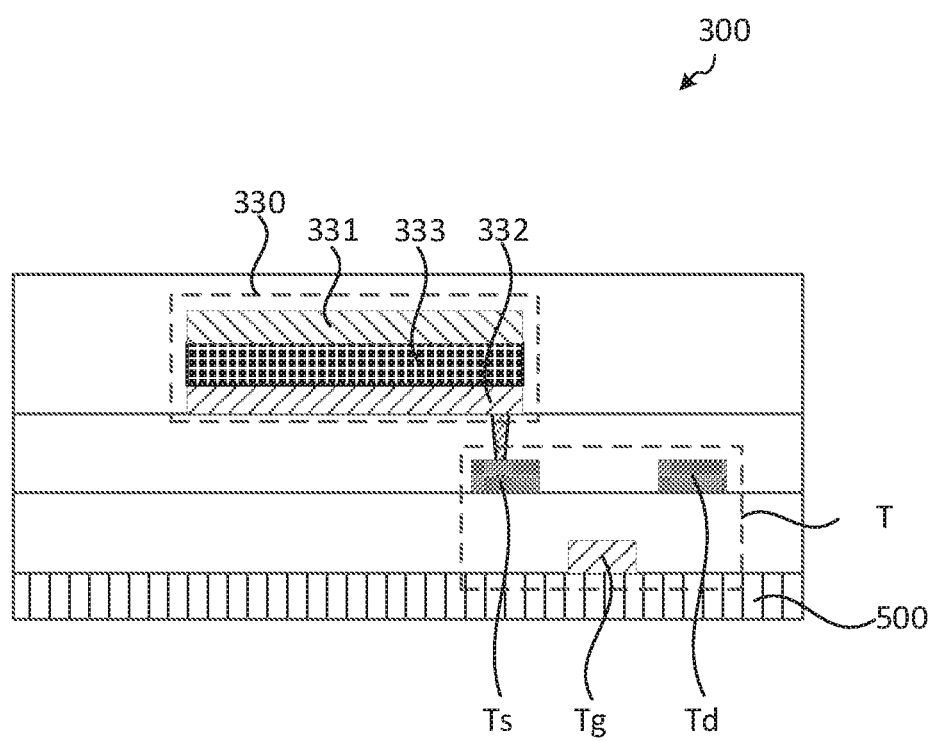
FIG. 17 is a diagram showing films of a fingerprint identification unit according to an embodiment of the present disclosure.

FIG. 16 is a circuit structural diagram of a fingerprint identification unit according to an embodiment of the present disclosure, and FIG. 17 is a diagram of films of the fingerprint identification unit according to an embodiment of the present disclosure. Referring to FIGS. 16 and 17, the fingerprint identification unit 300 includes a photosensor 330 and a driving circuit 340 connected to the photosensor 330. The driving circuit 340 includes a thin film transistor T and a storage capacitor C. A positive electrode of the photosensor 330 is electrically connected to a first electrode of the storage capacitor C, and a negative electrode 332 of the photosensor 330 is electrically connected to a second electrode of the storage capacitor C and to a source electrode Ts of the thin film transistor T. A gate electrode Tg of the thin film transistor T is electrically connected to a switch control line Gate, and a drain electrode Td of the thin film transistor T is electrically connected to a signal line Data. Precision of the fingerprint identification unit 300 is inversely proportional to a capacitance value of the storage capacitor C corresponding to the fingerprint identification unit 300, that is, the storage capacitor C in the fingerprint identification unit 300 with a high fingerprint identification has a small capacitance value, and the storage capacitor C in the fingerprint identification unit 300 with a low fingerprint identification has a large capacitance value.

The working process of the fingerprint identification unit 300 is described below. In the fingerprint identification stage, a low-voltage signal (e.g., a constant-voltage signal of −5V) is input to a node H1 and a high-voltage signal (e.g., a constant-voltage signal of 1.5V) is input to the signal line Data. The entire fingerprint identification stage includes a preparation stage, a fingerprint signal acquisition stage and a fingerprint signal detection stage. In the preparation stage, the thin film transistor T of the fingerprint identification unit 300 is turned on via the switch control line Gate by a driving chip (not illustrated in FIGS. 16 and 17) electrically connected to the fingerprint identification unit 300. Then the storage capacitor C is charged until the charging is completed. In the fingerprint signal acquisition stage, the thin film transistor T of the fingerprint identification unit 300 is turned off by the switch control line Gate. When a user presses the display panel with his finger, the light emitted from the light source 700 is irradiated to a touch body 800 and then is reflected by the surface of the fingerprint of the touch body 800 to form reflected light. The light reflected by the touch body 800 is incident on the fingerprint identification unit 300, received by the photosensor 330 of the fingerprint identification unit 300, and converted into a current signal whose direction is from a node H2 to the node H1, thereby making the potential of H2 change. In the fingerprint signal detection stage, the change amount of potential at the node H2 may be directly measured and then the magnitude of the current signal is determined. Therefore, the larger the capacitance value of the storage capacitor C is, the smaller the change amount of potential at the node H2 is, and the lower the precision of the fingerprint identification unit 300 is.

Continually referring to FIG. 17, the photosensor 330 is a photosensitive diode. The photosensitive diode further includes a PIN junction 333. A positive electrode (anode) 331 of the photosensitive diode is disposed on a side, facing away from the base substrate 500, of the fingerprint identification unit 300. The PIN junction 333 is disposed on a side, close to the base substrate 500, of the positive electrode 331 of the photosensitive diode. A negative electrode (cathode) 332 of the photosensitive diode is disposed on a side, close to the base substrate 500, of the PIN junction 333. The thin film transistor T is disposed on a side, close to the base substrate 500, of the negative electrode 332 of the photosensitive diode, and the negative electrode 332 of the photosensitive diode is electrically connected to the source electrode Ts of the thin film transistor T through a via hole. The working principle of the photosensitive diode is that the PIN junction 333 is photosensitive and unilaterally conductive. When the PIN junction 333 is not irradiated by light, the PIN junction 333 has a small reverse saturation leakage current, i.e., a dark current. In this case, the photosensitive diode is turned off. When exposed to light, the reverse saturation leakage current of the PIN junction 333 dramatically increases to form a current signal. The current signal varies with an intensity of incident light. With the photosensor 330 configured in such a manner, the current signal is increased, and then the precision of the fingerprint identification unit 300 is increased.

Figure 18:
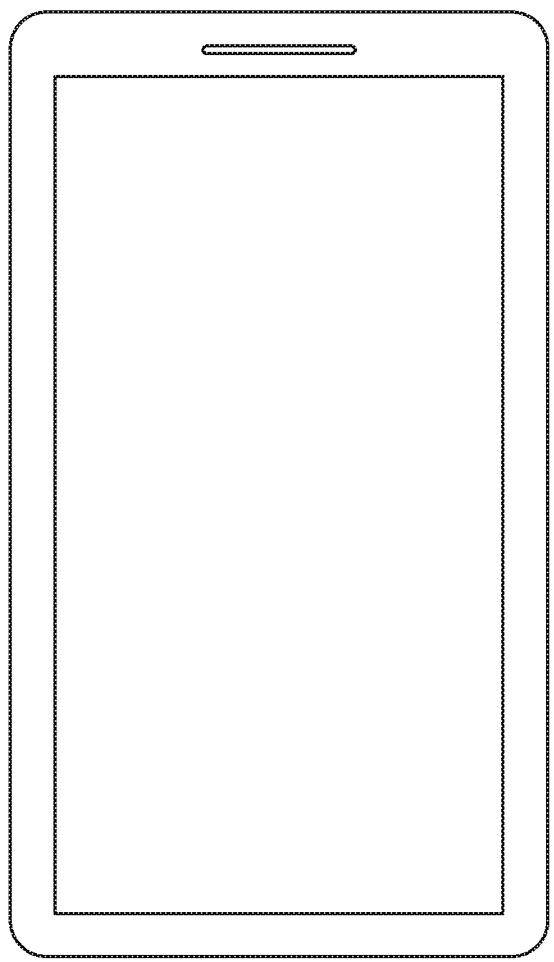
FIG. 18 is a structural diagram of a display apparatus according to an embodiment of the present disclosure.

An embodiment of the present disclosure further provides a display apparatus. FIG. 18 is a structural diagram of a display apparatus according to this embodiment of the present disclosure. Referring to FIG. 18, the display apparatus includes the display panel provided by any embodiment of the present disclosure. The display apparatus may be one of a mobile phone, a tablet PC, an electronic paper, and an electronic photo frame.

In the present disclosure, the display region of the display panel includes at least two display sub-regions with different fingerprint identification precision. That is, in the embodiment of the present disclosure, the display apparatus includes a region with high fingerprint identification precision and a region with low fingerprint identification precision. According to the user's touch habits, the display sub-region corresponding to a high touch frequency region is set to have a high fingerprint identification precision, and the display sub-region corresponding to a low touch frequency region is set to have a low fingerprint identification precision. Compared with the related art of improving the fingerprint identification precision of the entire screen region, the region with low fingerprint identification precision is set in the present disclosure, reducing the power consumption required by the fingerprint identification unit and the interference to other signal lines. In the region with high fingerprint identification precision, the fingerprint identification unit may implement a high-precision identification of fingerprints. Therefore, the embodiments of the present disclosure solve the problem in the related art that the fingerprint identification precision of the entire screen of the display apparatus is increased for improving the fingerprint identification precision of the display apparatus and the power consumption and noise interference of the signal lines are large accordingly. In the present disclosure, by setting different fingerprint identification precisions in different regions, the power consumption of the entire display apparatus is reduced and the noise interference of the signal lines is reduced on the basis of satisfying the requirement of providing high-precision fingerprint identification in some regions of the display apparatus. The display apparatus provided by the present disclosure provides, under the condition of consuming the same power consumption, a more favorable driving for the fingerprint identification unit of the display sub-region corresponding to the high touch frequency region, and thereby increasing the fingerprint identification precision. A region in which the fingerprint identification precision is increased is the high touch frequency region which is touched by the touch body more frequently and has a higher detection frequency, thereby improving the fingerprint identification precision of the display apparatus more effectively without increasing the power consumption. In summary, embodiments of the present disclosure improve the quality of the display apparatus and user operation experience.

It is to be noted that the above are only exemplary embodiments of the present disclosure and the technical principles used therein. It will be understood by those skilled in the art that the present disclosure is not limited to the specific embodiments described herein. Those skilled in the art can make various modifications, adaptations and substitutions without departing from the scope of the present disclosure. Therefore, while the present disclosure has been described in detail through the above-mentioned embodiments, the present disclosure is not limited to the above-mentioned embodiments and may include more other equivalent embodiments without departing from the concept of the present disclosure. The scope of the present disclosure is determined by the scope of the appended claims.

What is claimed is:

1. A display panel, comprising:
a display region and a non-display region surrounding the display region;
a base substrate; and
a plurality of fingerprint identification units disposed on a side of the base substrate, wherein the plurality of fingerprint identification units are in the display region and configured to perform fingerprint identification according to light reflected by a touch body to the plurality of fingerprint identification units,
wherein the display region comprises a plurality of display sub-regions, at least two of the plurality of display sub-regions are different in fingerprint identification precision.

2. The display panel of claim 1, wherein edges of the display region comprise a first edge and a second edge disposed opposite to each other, the at least two display sub-regions are sequentially arranged along a first direction, and the fingerprint identification precisions of the at least two display sub-regions are in a descending order or an ascending order along the first direction; and
the first direction is pointing from the first edge towards the second edge.

3. The display panel of claim 2, wherein the first edge is disposed at a bottom edge of a picture displayed by the display region, and the second edge is disposed at a top edge of the picture displayed by the display region; and
the fingerprint identification precisions of the at least two display sub-regions are in a descending order along the first direction.

4. The display panel of claim 2, wherein the at least two display sub-regions comprise a third display sub-region, a fourth display sub-region and a fifth display sub-region, which are sequentially arranged along the first direction;
the fingerprint identification precision of the third display sub-region is higher than the fingerprint identification precision of the fifth display sub-region; and the fingerprint identification precision of the fourth display sub-region is less than the fingerprint identification precision of the third display sub-region and greater than the fingerprint identification precision of the fifth display sub-region.

5. The display panel of claim 1, wherein the at least two display sub-regions are sequentially arranged along a first direction, and the fingerprint identification precision of each of the display sub-regions are in a descending order or an ascending order along the first direction; and
the first direction is pointing from a center of the display region to an edge of the display region.

6. The display panel of claim 5, wherein the fingerprint identification precisions of the at least two display sub-regions are in an ascending order along the first direction.

7. The display panel of claim 1, wherein the at least two display sub-regions comprise a first display sub-region and a second display sub-region;
the second display sub-region surrounds the first display sub-region, and the fingerprint identification precision of the first display sub-region is different from the fingerprint identification precision of the second display sub-region.

8. The display panel of claim 7, wherein the fingerprint identification precision of the first display sub-region is higher than the fingerprint identification precision of the second display sub-region.

9. The display panel of claim 8, wherein a distance from the first display sub-region to a bottom edge of a picture displayed by the display region is smaller than a distance from the first display sub-region to a top edge of the picture displayed by the display region.

10. The display panel of claim 7, wherein the first display sub-region is in a shape of one of or a combination of multiple of: an ellipse, a circle, a sector, a rectangle, a diamond, a trapezoid, a rounded rectangle, or a triangle.

11. The display panel of claim 1, wherein the at least two display sub-regions are different in a number density of fingerprint identification units; and
the number density is a number of the fingerprint identification units per unit area of the display sub-region.

12. The display panel of claim 11, further comprising: a plurality of pixel units arranged in an array on a side of the base substrate;
wherein the fingerprint identification unit comprises at least one photosensor;

the at least two display sub-regions at least comprise a sixth display sub-region and a seventh display sub-region, and the fingerprint identification precision of the sixth display sub-region is higher than the fingerprint identification precision of the seventh display sub-region;
a vertical projection of at least one of the photosensors in the sixth display sub-region on the base substrate is located between pixel units adjacent in a second direction and between pixel units adjacent in a third direction; and/or the vertical projection of at least one of the photosensors in the seventh display sub-region on the base substrate is all located between the adjacent pixel units in the second direction; and
the second direction and the third direction are parallel to a plane where the display panel is located, and intersect with each other.

13. The display panel of claim 1, wherein the at least two display sub-regions are different in precision of the fingerprint identification unit.

14. The display panel of claim 13, wherein the fingerprint identification unit comprises at least one photosensor;
the at least two display sub-regions at least comprise an eighth display sub-region and a ninth display sub-region, and the fingerprint identification precision of the eighth display sub-region is higher than the fingerprint identification precision of the ninth display sub-region; and the photosensor in the eighth display sub-region has a larger area than the photosensor in the ninth display sub-region.

15. The display panel of claim 14, further comprising: a plurality of pixel units arranged in an array on a side of the base substrate;
wherein at least one of the fingerprint identification units in the eighth display sub-region each comprises a first photosensor, wherein the first photosensor comprises a first part and a second part that are connected to each other, the first part is disposed between pixel units adjacent in a second direction, and the second part is disposed between pixel units adjacent in a third direction;
at least one of the fingerprint identification units in the ninth display sub-region each comprises a second photosensor disposed between pixel units adjacent in the second direction; and
the second direction and the third direction are parallel to a plane where the display panel is located, and intersect each other.

16. The display panel of claim 15, wherein the first photosensor is in at least one of a "cross" shape, a "T" shape or an "I" shape.

17. The display panel of claim 15, wherein the first photosensor further comprises a third part and a fourth part;
the third part is disposed between pixel units adjacent in the second direction, and the fourth part is disposed between pixel units adjacent in the third direction;
the first photosensor composed of the first part, the second part, the third part and the fourth part is in a closed ring shape, and a vertical projection of at least one of the pixel units on the base substrate is completely surrounded by a vertical projection of the first photosensor on the base substrate;
and the second photosensor further comprises a fifth part, a sixth part and a seventh part that are connected to each other; wherein
the fifth part is disposed between pixel units adjacent in the second direction, the sixth part is disposed between pixel units adjacent in the third direction, and the seventh part is disposed between pixel units adjacent in the third direction; and
the second photosensor composed of the fifth part, the sixth part and the seventh part is in an unclosed ring shape, and the vertical projection of at least one of the pixel units on the base substrate is partially surrounded by a vertical projection of the second photosensor on the base substrate.

18. The display panel of claim 17, wherein the pixel units completely surrounded by the vertical projection of the first photosensor on the base substrate, and the pixel units partially surrounded by the vertical projection of the second photosensor on the base substrate are first type pixel units;
the first type pixel units include one or two types of a red pixel, a green pixel or a blue pixel;
the pixel unit is further reused as a light source of the fingerprint identification unit, the pixel unit has a display stage and a fingerprint identification stage; and
in the fingerprint identification stage, the first type pixel units emits light and serve as a light source for the touch body.

19. The display panel of claim 14, further comprising: a plurality of pixel units arranged in an array on a side of the base substrate;
wherein the plurality of pixel units comprise a first pixel unit, a second pixel unit and a third pixel unit; and
a length, in a fourth direction, of the first pixel unit is smaller than a length, in the fourth direction, of the second pixel unit and smaller than a length, in the fourth direction, of the third pixel unit, a distance between the first pixel unit and the adjacent pixel unit is greater than a distance between the second pixel unit and the third pixel unit adjacent to each other, and in the eighth display sub-region, a vertical projection of at least one of the photosensors on the base substrate is adjacent to the first pixel unit.

20. The display panel of claim 19, wherein the first pixel unit is a green pixel, the second pixel unit is a blue pixel, and the third pixel unit is a red pixel.

21. The display panel of claim 13, wherein the photosensors are arranged in an array, and the second direction and the third direction intersect perpendicularly.

22. The display panel of claim 13, wherein the plurality of pixel units comprise red pixels, green pixels and blue pixels; and
the pixel unit is further reused as a light source of the fingerprint identification unit;
each driving cycle of the display panel comprises a display stage and a fingerprint identification stage; and
in the fingerprint identification stage, one or two types of the red pixel, green pixel and blue pixel emit light and serve as light sources for the touch body.

23. The display panel of claim 1, wherein the fingerprint identification unit comprises: a photosensor and a driving circuit connected to the photosensor, the driving circuit comprises a thin film transistor and a storage capacitor,
a positive electrode of the photosensor is electrically connected to a first electrode of the storage capacitor, and a negative electrode of the photosensor is electrically connected to a second electrode of the storage capacitor and to a source electrode of the thin film transistor; a gate electrode of the thin film transistor is electrically connected to a switch control line, and a drain electrode of the thin film transistor is electrically connected to a signal line; and precision of the fingerprint identification unit is inversely proportional to a capacitance value of the storage capacitor corresponding to the fingerprint identification unit.

24. The display panel of claim 23, wherein the photosensor is a photosensitive diode and the photosensitive diode further comprises a PIN junction;
  the positive electrode of the photosensitive diode is disposed on a side, facing away from the base substrate, of the fingerprint identification unit;
  the PIN junction is disposed on a side, close to the base substrate, of the positive electrode of the photosensitive diode;
  the negative electrode of the photosensitive diode is disposed on a side, close to the base substrate, of the PIN junction; and
  the thin film transistor is disposed on a side, close to the base substrate, of the negative electrode of the photosensitive diode, and the negative electrode of the photosensitive diode is electrically connected to the source electrode of the thin film transistor through a via hole.

25. A display apparatus, comprising a display panel, wherein the display panel comprises:
  a display region and a non-display region surrounding the display region;
  a base substrate; and
  a plurality of fingerprint identification units disposed on a side of the base substrate, wherein the plurality of fingerprint identification units are in the display region and configured to perform fingerprint identification according to light reflected by a touch body to the plurality of fingerprint identification units,
  wherein the display region comprises a plurality of display sub-regions, at least two of the plurality of display sub-regions are different in fingerprint identification precision.

* * * * *